United States Patent
Yabuta et al.

(10) Patent No.: US 8,031,273 B2
(45) Date of Patent: Oct. 4, 2011

(54) DISPLAY DEVICE, VIEWING ANGLE CONTROL DEVICE, AND ELECTRONIC DEVICE

(75) Inventors: Koji Yabuta, Kashiba (JP); Hiroshi Fukushima, Yamatokoriyama (JP); Tomoo Takatani, Nara (JP); Akira Imai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1238 days.

(21) Appl. No.: 11/575,244

(22) PCT Filed: Sep. 12, 2005

(86) PCT No.: PCT/JP2005/016773
§ 371 (c)(1),
(2), (4) Date: Mar. 14, 2007

(87) PCT Pub. No.: WO2006/030745
PCT Pub. Date: Mar. 23, 2006

(65) Prior Publication Data
US 2008/0055221 A1    Mar. 6, 2008

(30) Foreign Application Priority Data
Sep. 17, 2004 (JP) .................................. 2004-272406

(51) Int. Cl.
*G02F 1/1335* (2006.01)
*G02F 1/1337* (2006.01)

(52) U.S. Cl. ............... 349/12; 349/1; 349/129; 345/173

(58) Field of Classification Search .................... 349/12, 349/1, 129; 345/173, 174
See application file for complete search history.

(56) References Cited

U.S. PATENT DOCUMENTS

| | | | |
|---|---|---|---|
| 4,198,539 A | 4/1980 | Pepper, Jr. |
| 4,293,734 A | 10/1981 | Pepper, Jr. |
| 4,302,011 A | 11/1981 | Pepper, Jr. |
| 4,353,552 A | 10/1982 | Pepper, Jr. |
| 4,371,746 A | 2/1983 | Pepper, Jr. |
| 4,430,917 A | 2/1984 | Pepper, Jr. |
| 4,626,851 A | 12/1986 | Tooze |
| 4,953,949 A | 9/1990 | Dallas |
| 5,513,334 A | 4/1996 | Alexander |

(Continued)

FOREIGN PATENT DOCUMENTS

JP     56-500230 A     2/1981

(Continued)

OTHER PUBLICATIONS

Koji Yabuta et al.; "Display Device and Electronic Apparatus", U.S. Appl. No. 11/576,555, filed Apr. 3, 2007.

(Continued)

*Primary Examiner* — Nathanael R Briggs
(74) *Attorney, Agent, or Firm* — Keating & Bennett, LLP

(57) ABSTRACT

A first transparent electrode film, which is a component of a SW-LCD for viewing angle control, is used as a touch panel. When a contacting object contacts the surface of the first transparent electrode film, a position detector detects currents flowing from plural parts of the first transparent electrode film so as to detect the contacting position of the contacting object, with reference to the detection result. With this, it is possible to provide a built-in touch sensor display device which is thin, lightweight, and low-cost, a viewing angle control device, and an electronic device.

14 Claims, 17 Drawing Sheets

U.S. PATENT DOCUMENTS

| | | | |
|---|---|---|---|
| 5,519,533 A | 5/1996 | Nomura et al. | |
| 5,638,082 A | 6/1997 | Grimm | |
| 5,642,214 A | 6/1997 | Ishii et al. | |
| 5,787,152 A | 7/1998 | Freadman | |
| 5,831,698 A | 11/1998 | Depp et al. | |
| 5,899,551 A | 5/1999 | Neijzen et al. | |
| 5,936,596 A | 8/1999 | Yoshida et al. | |
| 5,945,965 A | 8/1999 | Inoguchi et al. | |
| 6,205,554 B1 | 3/2001 | Sasaki et al. | |
| 6,445,434 B2 | 9/2002 | Takato et al. | |
| 6,987,550 B2 | 1/2006 | Takato et al. | |
| 6,989,880 B2 | 1/2006 | Takato et al. | |
| 7,330,178 B2* | 2/2008 | Yorio et al. | 345/169 |
| 7,486,350 B2 | 2/2009 | Yabuta et al. | |
| 2001/0015782 A1 | 8/2001 | Takato et al. | |
| 2001/0026330 A1* | 10/2001 | Oh | 349/12 |
| 2003/0007227 A1 | 1/2003 | Ogino | |
| 2003/0146893 A1 | 8/2003 | Sawabe | |
| 2003/0147112 A1 | 8/2003 | Mukawa | |
| 2003/0195421 A1 | 10/2003 | Demers et al. | |
| 2004/0033812 A1 | 2/2004 | Matsunaga et al. | |
| 2004/0085353 A1 | 5/2004 | Kawakami et al. | |
| 2004/0100598 A1 | 5/2004 | Adachi et al. | |
| 2004/0185920 A1 | 9/2004 | Choi et al. | |
| 2004/0207594 A1 | 10/2004 | Kubo | |
| 2004/0217945 A1 | 11/2004 | Miyamoto et al. | |
| 2004/0252258 A1* | 12/2004 | Matsushima | 349/96 |
| 2004/0252679 A1 | 12/2004 | Williams et al. | |
| 2005/0020325 A1 | 1/2005 | Enger et al. | |
| 2005/0143124 A1 | 6/2005 | Kennedy et al. | |
| 2005/0215291 A1 | 9/2005 | McDonald | |
| 2005/0243265 A1 | 11/2005 | Winlow et al. | |
| 2005/0286000 A1 | 12/2005 | Tsai et al. | |
| 2006/0066794 A1 | 3/2006 | Hotta et al. | |

FOREIGN PATENT DOCUMENTS

| | | |
|---|---|---|
| JP | 06-110403 A | 4/1994 |
| JP | 08-114795 A | 5/1996 |
| JP | 08-136909 A | 5/1996 |
| JP | 09-105958 A | 4/1997 |
| JP | 10-153968 A | 6/1998 |
| JP | 10-240186 A | 9/1998 |
| JP | 10-319373 A | 12/1998 |
| JP | 11-007045 A | 1/1999 |
| JP | 11-174489 A | 7/1999 |
| JP | 2001-264768 A | 9/2001 |
| JP | 2001-318374 A | 11/2001 |
| JP | 2001-344050 A | 12/2001 |
| JP | 2003-015535 A | 1/2003 |
| JP | 2003-066417 A | 3/2003 |
| JP | 2003-099192 A | 4/2003 |
| JP | 2003-298715 A | 10/2003 |
| JP | 2004-038035 A | 2/2004 |
| JP | 2004-062094 A | 2/2004 |
| JP | 2004-133334 A | 4/2004 |
| JP | 2004-233527 A | 8/2004 |
| JP | 2004-279793 A | 10/2004 |
| JP | 2005-260858 A | 9/2005 |
| JP | 2005-292586 A | 10/2005 |
| JP | 2005-316470 A | 11/2005 |
| JP | 2005-345799 A | 12/2005 |
| JP | 2006-003754 A | 1/2006 |
| JP | 2006-011451 A | 1/2006 |
| JP | 2006-064882 A | 3/2006 |
| JP | 2006-098784 A | 4/2006 |
| KR | 2000-0039870 A | 7/2000 |
| KR | 2003-0040345 A | 5/2003 |
| WO | 80/01762 A1 | 9/1980 |

OTHER PUBLICATIONS

Official Communication for PCT Application No. PCT/JP2005/016590; mailed on Oct. 18, 2005.

Official Communication for PCT Application No. PCT/JP2005/015680; mailed on Oct. 25, 2005.

Official Communication for PCT Application No. PCT/JP2005/015661; mailed on Oct. 25, 2005.

Akira Imai et al.; "Display Control Device, Display Apparatus, Method of Controlling Display Device, Display Control Program, and Storage Medium Storing the Program"; U.S. Appl. No. 11/574,371, filed Feb. 27, 2007.

Akira Imai et al.; "Viewing-Angle Control Device, Display Apparatus, Method for Controlling Viewing-Angle Control Device, Viewing-Angle Control Program, and Storage Medium Storing the Program"; U.S. Appl. No. 11/574,375, filed Feb. 27, 2007.

Tomoo Takatani et al.; "Display Device, Viewing Angle Control Device, and Electronic Apparatus"; U.S. Appl. No. 11/574,609, filed Mar. 2, 2007.

Official Communication for PCT Application No. PCT/JP2005/016003; mailed on Oct. 11, 2005.

Official Communication for PCT Application No. PCT/JP2005/016773; mailed on Oct. 25, 2005.

Hiroshi Fukushima et al.; "Display Device, Viewing Angle Control Device, and Electronic Apparatus"; U.S. Appl. No. 11/575,112, filed Mar. 12, 2007.

Official Communication issued in corresponding U.S. Appl. No. 11/574,371, mailed on Jan. 12, 2010.

Official Communication issued in corresponding U.S. Appl. No. 11/574,375, mailed on Jan. 12, 2010.

Official Communication issued in corresponding U.S. Appl. No. 11/574,609, mailed on Dec. 8, 2009.

* cited by examiner

→ RUBBING DIRECTION OF ALIGNMENT FILM 24
---▶ RUBBING DIRECTION OF ALIGNMENT FILM 25
↔ TRANSMISSION AXIS OF SECOND POLARIZING PLATE 11
◀---▶ TRANSMISSION AXIS OF FIRST POLARIZING PLATE 13

F I G. 8 (a)
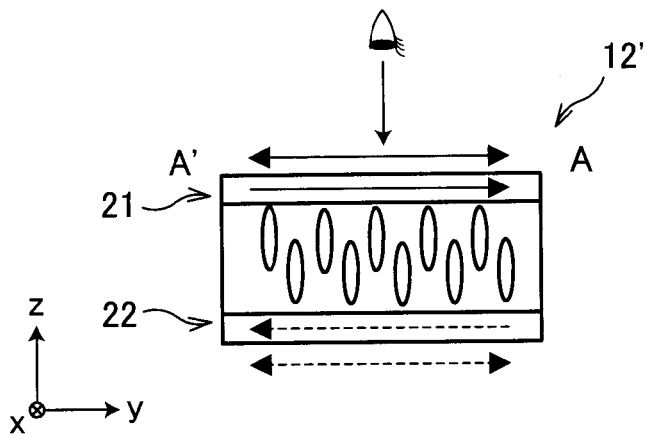
F I G. 8 (b)
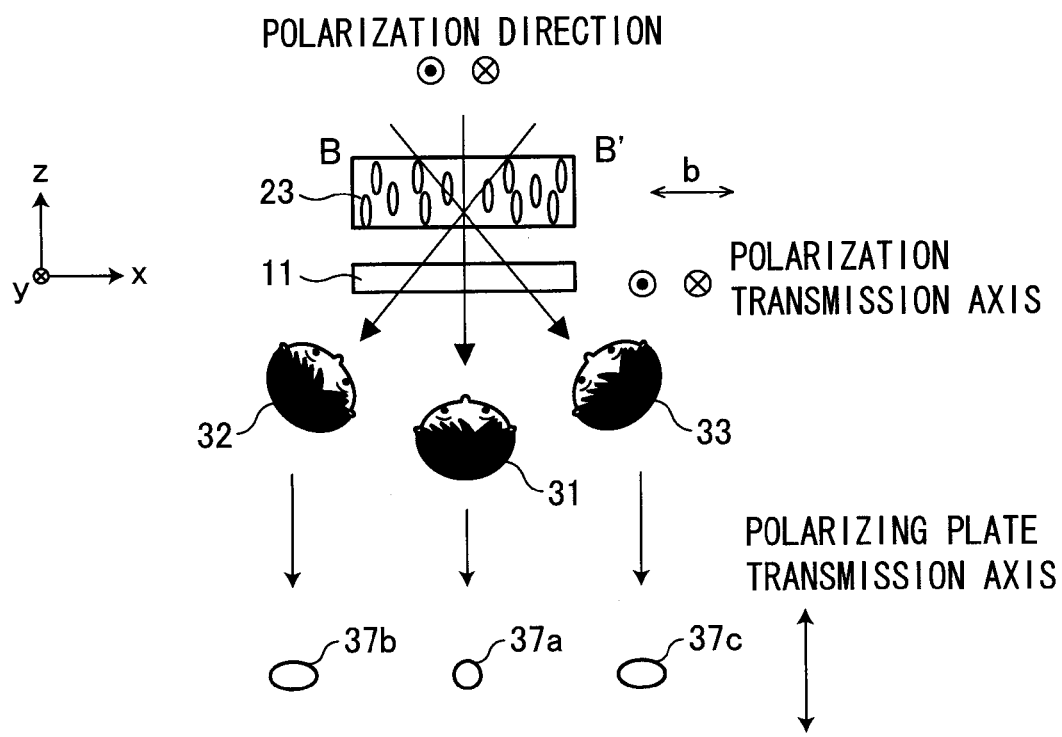

→ RUBBING DIRECTION OF ALIGNMENT FILM 24
--→ RUBBING DIRECTION OF ALIGNMENT FILM 25
↔ TRANSMISSION AXIS OF SECOND POLARIZING PLATE 11
◁--▷ TRANSMISSION AXIS OF FIRST POLARIZING PLATE 13

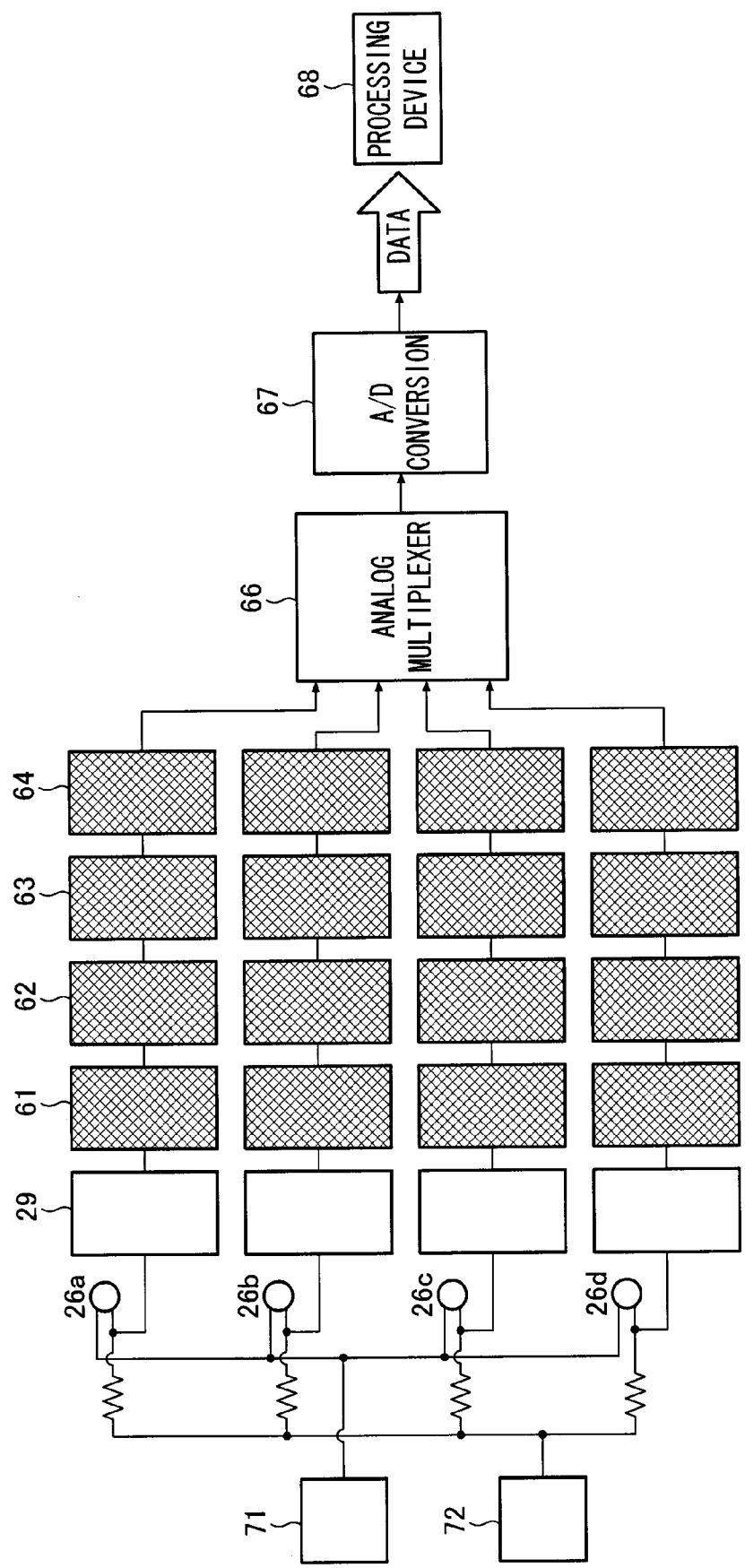

DISPLAY DEVICE, VIEWING ANGLE CONTROL DEVICE, AND ELECTRONIC DEVICE

BACKGROUND OF THE INVENTION

1. Field of the Invention

The present invention relates to a display device, a viewing angle control device, and an electronic device, and more specifically to a display device which can switch to a mode in which an image to be viewed changes depends on the viewing direction and which can detect which position on a display screen is touched by a pen or a finger, a viewing angle control device, and an electronic device.

2. Description of the Related Art

The weight of electronic devices has recently been reduced, with the result that electronic devices with displays, such as mobile phones and mobile PCs, can now be used in public spaces. This, however, has induced such a problem that a person around the user can peek a confidential document and personal information.

To solve this problem, there is proposed a display device which is usually set in a wide viewing angle display mode and can be set in a narrow viewing angle display mode when the display device is used in a public space. In the narrow viewing angle mode, a normal image is viewed from a position right in front of the display where the user is positioned, whereas a solid color image or an image different from the normal image is viewed from a position in an oblique direction to the display. Moreover, since the wide viewing angle display mode is available, a wide viewing angle is obtained when, for example, a large number of persons view an image which has been taken.

In the meantime, various types of electronic devices adopting a touch sensor and a touch panel, which are input devices detecting a position where a finger, a pen, or the like touches, have recently been in widespread use.

A touched position is detected by known methods such as an electrostatic capacitive coupling method, a resistant film method, an infrared light method, a supersonic method, and an electromagnetic induction/coupling method. Among these methods, the resistant film method has widely been adopted. According to this method a position is detected in such a manner that two transparent resistant films are provided to face each other and these films are in contact with one another at a position where a pen or the like touches one of the films.

In case where a touch panel is combined with a display, the touch sensor capability is achieved by, for example, providing a touch panel in front of an image display section such as a liquid crystal display panel. A touch panel adopting the resistant film method is combined with an image display device in such a manner that, two transparent resistant films are pasted together to form a resistant sheet and this resistant sheet is pasted onto the front surface of the image display device. Patent Document 1 (Japanese PCT National Phase Unexamined Patent Publication No. 56-500230; published on Feb. 26, 1981) and Patent Document 2 (Japanese Laid-Open Patent Application No. 2003-66417; published on Mar. 5, 2003) disclose a basic device of a touch panel adopting the electrostatic capacitive coupling method.

In case where a touch sensor is combined with one of various types of electronic devices by pasting a touch panel onto the front surface of the electronic device, the transmittance of light from the display device is reduced because the touch panel is provided on the display screen of the electronic device, i.e. provided between a displayed image and the user, and hence the display quality is deteriorated. The transmittance of light is particularly low in the case of a touch panel adopting the resistant film method, because air with a different refractive index exists between two resistant films.

Furthermore, the addition of a touch panel increases the total thickness and weight of the device. Providing a touch panel on an electronic device is also disadvantageous in terms of cost reduction.

The same problems occur also in a case where a touch sensor is provided in the aforesaid display device which can be switched to the narrow viewing angle mode.

SUMMARY OF THE INVENTION

The present invention was done to solve the problems above, and the objective of the present invention is to provide a built-in touch sensor display device which is thin, light and low-cost even if a touch sensor is provided therein, a viewing angle control device, and an electronic device.

To achieve the objective above, a display device of the present invention includes display switching means for electrically switching an image to be viewed, between a single image display mode and a plural image display mode; and image display means for displaying the image, the display switching means keeping a liquid crystal layer between a pair of substrates and including a front-side first transparent conductive film for applying a voltage to the liquid crystal layer and a back-side second transparent conductive film, the display device further including position detection means for detecting, when a contacting object contacts a front surface of the display switching means, a contacting position of the contacting object by detecting currents flowing from plural parts of the first transparent conductive film.

According to this arrangement, the display device of the present invention includes the position detection means for detecting a current flowing from plural parts of the first transparent conductive film provided in the display switching means.

In other words, the display device of the present invention performs position detection using the electrostatic capacitive coupling in such a manner that a current flowing from plural parts of the first transparent conductive film when a contacting object contacts the surface of the first transparent conductive film is detected. With this, being different from the resistant film method in which position detection is carried out using two opposing transparent resistant films, the transmittance of light is not decreased because no air with a different refractive index exists between two resistant films.

It is therefore possible to provide a touch sensor without decreasing the brightness of an image displayed by the display device.

It is also possible to avoid the deterioration of display quality which occurs when a transparent conductive film for touch panel is added to the front surface of the display device.

Furthermore, since the first conductive film is used as a touch panel as described above, it is possible to reduce the thickness and weight of the display device even if touch sensor capability is incorporated therein.

Furthermore, since the first transparent conductive film provided in the display switching means functions as a transparent conductive film required as a touch panel, it is unnecessary to additionally provide a transparent conductive film, and hence the number of components is reduced. It is therefore possible to restrain cost increase even if touch sensor capability is provided.

Therefore, according to the present invention, it is possible to reduce the thickness, weight, and manufacturing costs of a high-performance display device which can switch between a single image display mode and a plural image display mode by applying a voltage to the liquid crystal layer by using first and second transparent conductive films and which also has touch sensor capability.

The display device of the present invention is preferably arranged such that in the single image display mode, an image displayed by the image display means is viewable in any directions, whereas, in the plural image display mode, when viewed in a certain direction, another image overlaps the image displayed by the image display means, on account of birefringence caused by the display switching means.

According to this arrangement, it is possible to provide a display device which is arranged so that an image displayed by the image display means is viewable in any directions when the single image display mode is set, whereas, in a certain direction, another image overlaps the displayed image so that the displayed image is hidden, when the plural image mode is set.

It is noted that the aforesaid certain direction is a direction other than the aforesaid front direction.

The display device of the present invention is preferably arranged such that the display switching means further includes first polarizing means for outputting unidirectional linearly polarized light and second polarizing means for allowing the linearly polarized light, which has been output from the display switching means, to pass through, in the liquid crystal layer, a longitudinal axis direction of liquid crystal molecules is always in parallel to or orthogonal to a linear polarization direction of light incident to the liquid crystal molecules, when the liquid crystal molecules are projected in a direction orthogonal to surfaces of said pair of substrates, in the single image display mode, a longitudinal axis direction of at least some of the liquid crystal molecules is aligned to be in parallel to or orthogonal to the surfaces of said pair of substrates, and in the plural image display mode, the longitudinal axis direction of said at least some of the liquid crystal molecules is aligned to be tilted with respect to the surfaces of said pair of substrates.

It is noted that the aforesaid word "tilted" indicates that the subject is neither in parallel to nor orthogonal to a direction or a plane.

For example, the longitudinal axis direction of the liquid crystal molecules in the liquid crystal layer is on a plane formed by either the transmission axis or the absorption axis of the first polarizing means and the traveling direction of the light, and the liquid crystal molecules is arranged so that the longitudinal axis direction thereof is either (i) orthogonal to or in parallel to the traveling direction of the light or (ii) tilted with respect to the traveling direction of the light.

That is to say, in the single image display mode, the longitudinal axis direction of the liquid crystal molecules in the liquid crystal layer is substantially in parallel to the pair of substrates and also either in parallel to or orthogonal to the polarization transmission axis of the first polarizing means, whereas, in the plural image display mode, from the aforesaid state in the single image display mode, the longitudinal axis direction of the liquid crystal molecules is tilted towards the direction orthogonal to the substrate. Alternatively, in the single image display mode, the longitudinal axis direction of the liquid crystal molecules in the liquid crystal layer is orthogonal to the substrates, whereas, in the plural image display mode, from the aforesaid state in the single image display mode, the longitudinal axis direction of the liquid crystal molecules is tilted on a plane which is (i) either in parallel to or orthogonal to the polarization transmission axis of the first polarizing means and (ii) orthogonal to the substrates.

According to this arrangement, the first polarizing means causes light incident to the display switching means to be unidirectional linearly polarized light. Also, in the liquid crystal layer of the display switching means, the longitudinal axis direction when the liquid crystal molecule is projected in the direction orthogonal to the substrates is always in parallel to or orthogonal to the polarizing direction of the light having passed through the first polarizing means.

In case where the polarizing direction of linearly polarized light incident to a liquid crystal layer is in parallel to or orthogonal to the longitudinal axis direction of liquid crystal molecules projected in a particular direction, birefringence in the liquid crystal layer does not occur when viewed in the foregoing particular direction. Therefore, whichever mode is selected, birefringence does not occur in the liquid crystal layer when viewed in a direction in parallel to a plane drawn by the rotation of a point on the liquid crystal molecule, by which rotation the alignment is changed (hereinafter, the foregoing direction will be referred to as front direction). Therefore, an image displayed on the image display means is viewable when the linearly polarized light obtained at the second polarizing means is in the same direction as the linearly polarized light obtained at the first polarizing means, because of such an arrangement that, for example, the polarization transmission axis of the first polarizing means is identical with that of the second polarizing means, or a member is additionally provided so that the polarizing direction of linearly polarized light emitted from the first polarizing means is rotated to conform to the transmission axis of the second polarizing means and then the light enters the second polarizing means.

On the other hand, when viewed in a direction other than the front direction (hereinafter, this will be referred to as "when viewed in an oblique direction"), an image to be viewed is different between the single image display mode and the plural image display mode.

In the single image display mode, since the longitudinal axis direction of the liquid crystal molecules is in parallel to or orthogonal to the surfaces of the substrates, the longitudinal axis direction of the liquid crystal molecule projected in an oblique direction is identical with the longitudinal axis direction of the liquid crystal molecule viewed in the front direction. Therefore, birefringence does not occur in the liquid crystal molecule even when the molecule is viewed in oblique direction, and hence an image on the image display means is viewable because incident light can pass through the liquid crystal layer and the second polarizing means.

On the other hand, in the plural image display mode, since the longitudinal axis direction of the liquid crystal molecules is tilted with respect to the surfaces of the substrates, the longitudinal axis direction of the liquid crystal molecules projected in an oblique direction forms an angle with the polarizing direction of the incident light. Therefore, when viewed in an oblique direction, birefringence occurs in the liquid crystal molecules, the polarizing direction of the light passing through the liquid crystal layer is changed, the light cannot pass through the second polarizing means, and hence an image on the image display means is not viewable.

Therefore, in the single image display mode, an image displayed by the image display means is viewable in any directions, whereas, in the plural image mode, an image displayed by the image display means is viewable only in a particular direction. With this, the display device can change the viewing angle in accordance with situations where a confidential document is viewed in a public space and where an image having been taken is viewed by a number of persons.

In this way, in addition to the aforesaid effect, the display device of the present invention can produce a high-quality image with a simple arrangement that a viewing angle is controlled by controlling birefringence.

There may be in the liquid crystal layer of the display switching means a region where the alignment of the liquid crystal molecules is unchanged both in the plural image display mode and the single image display mode. With this arrangement, an image on the display device is viewable at the aforesaid region, when the plural image display mode is set and the display device is viewed in oblique direction.

When the projection of the liquid crystal molecule is shaped as a perfect circle, all directions are considered as the longitudinal axis direction.

It is noted that the word "parallel" in this specification includes not only a case of precise parallelism but also substantial parallelism on condition that an effect similar to the case of precise parallelism is achieved. It is also noted that the word "vertical" includes not only a case of precise verticality but also substantial verticality on condition that an effect similar to the case of precise verticality is achieved.

The display device of the present invention is preferably arranged such that (i) display switching by the display switching means between the single image display mode and the plural image display mode and (ii) detection of the contacting position of the contacting object by the position detection means are alternately switchable.

In this manner, (i) display switching by the display switching means between the single image display mode and the plural image display mode and (ii) detection of the contacting position of the contacting object by the position detection means are alternately switched, and hence the first transparent conductive film used for these functions is used in a time-shared manner.

Since the first transparent conductive film is used in a time-shared manner, a signal for display switching, which is supplied to the display switching means, does not act as a noise on a signal for position detection. When the problem of noise occurs, an insulating layer for reducing the same is required. Such an insulating layer further deteriorates the display quality of an image displayed on the image display means. In the display device of the present invention, the first transparent conductive film is used in a time-shared manner and hence the aforesaid noise does not occur. The insulating layer is therefore unnecessary and hence the aforesaid problem of deterioration is resolved. As such an arrangement, for example, a switching circuit is provided.

The display device of the present invention preferably further includes: a first circuit which supplies to the first transparent conductive film a voltage or current for display switching; and a second circuit which supplies to the first transparent conductive film a voltage or current for position detection, a frequency of the voltage or current supplied from the first circuit to the first transparent conductive film being different from a frequency of the voltage or current supplied from the second circuit to the first transparent conductive film. Also, the display device preferably further includes frequency detection means for obtaining only a voltage or current which has a particular frequency.

According to these arrangements, in the display device of the present invention, switching between the single image display mode and the plural display mode by the display switching means is carried out independently of position detection of the contacting object by the position detection means.

In other words, according to the arrangements above, the display switching and the position detection can be carried out simultaneously using the first transparent conductive film. This makes it possible to eliminate a delay in application of a display voltage, which may occur when the first transparent conductive film is used in a time-shared manner.

In addition to the elimination of a delay in application of a display voltage, the position detection is speedily executable. It is therefore possible to provide a display device which can suitably perform both display switching and position detection.

When a contacting object contacts the surface of the first transparent conductive film to which voltages or currents have simultaneously been supplied from the first circuit and the second circuit, currents flows from plural parts of the first transparent conductive film. Since the position detection is carried out using a current corresponding to a frequency supplied from the second circuit, the display device of the present invention is further provided with frequency detection means which obtains only a voltage or current with a particular frequency. This makes it possible to detect a current corresponding to a frequency for the position detection, from currents on the first transparent conductive film, which have two types of frequencies.

Therefore, display switching and position detection are both suitably carried out even in a case where the first transparent film receives a voltage or current simultaneously from the first circuit and the second circuit.

The display device of the present invention is preferably arranged such that the first transparent conductive film is divided so as to have plural regions, and a current flowing between at least two of the regions is detected by the position detection means.

According to this arrangement, the contacting position can be detected with reference to a current flowing between at least two regions. This improves the precision of the position detection.

The display device of the present invention is preferably arranged such that a polarization transmission axis of the first polarizing means is in parallel to a polarization transmission axis of the second polarizing means, and the polarization transmission axes are in parallel to or orthogonal to the longitudinal axis direction of the liquid crystal molecules, when the liquid crystal molecules are projected in the direction orthogonal to the surfaces of said pair of substrates.

It is noted that the word "same" includes not only a case of complete sameness but also substantial sameness on condition that an effect similar to the case of complete sameness is achieved. It is also noted that the word "parallel" includes not only a case of precise parallelism but also substantial parallelism on condition that an effect similar to the case of precise parallelism is achieved. It is also noted that the word "vertical" includes not only a case of precise verticality but also substantial verticality on condition that an effect similar to the case of precise verticality is achieved.

According to the arrangement above, since the polarization transmission axes of the first polarizing means and the second polarizing means are in the same direction, the second polarizing means can obtain linearly polarized light emitted from the liquid crystal layer, without requiring an additional member. It is therefore possible to obtain linearly polarized light emitted from the liquid crystal layer, by means of a simple arrangement.

The display device of the present invention is preferably arranged such that the second transparent conductive film is a pattern electrode with a particular shape, and alignment of the liquid crystal molecules in the liquid crystal layer changes at a region where a voltage is applied to the pattern electrode.

According to this arrangement, when switching between the single image display mode and the plural image display mode is carried out, only the alignment of those liquid crystal molecules receiving a voltage applied to the pattern electrodes. On this account, the region where the alignment changes corresponds to the particular shape of the pattern electrodes. In a region where the alignment is unchanged, regardless of the mode, an image on the image display device is viewable even in oblique directions. Therefore, when the plural image display mode is set and the display device is viewed in oblique direction, a particular shape corresponding to the pattern electrode is viewed.

For example, in case where the plural image display mode is set in response to voltage application to the pattern electrode, a pattern electrode is cut out so as not to overlap a shape of a character or a logo so that, when the plural image display mode is set, an image in which the character or logo is shown in a black background is viewed in oblique direction.

The display device of the present invention preferably further includes third polarizing means for causing unidirectional linearly polarized light to enter the image display means, the third polarizing means being provided on one surface of the image display means, whereas the first polarizing means is provided on the other surface of the image display means, the second polarizing means being provided on one surface of the display switching means, and the other surface of the display switching means, on which the second polarizing means is not provided, being pasted onto the image display means.

According to this arrangement, since the third polarizing means, the image display means, the first polarizing means, the display switching means, and the second polarizing means are provided this order, image quality of the display device is improved.

Furthermore, since the polarizing means is provided only on one side of the display switching means, only one polarizing means, i.e. second polarizing means is sandwiched between the image display means and the display switching means. This is advantageous for cost reduction and simplification of the manufacturing process. Moreover, since the polarizing means is provided only on one side of the display switching means, the present invention can be adopted to a case where the polarizing means have already been provided on both sides of the image display means, e.g. a case where a liquid crystal display device is used as the image display means.

The display device of the present invention is preferably arranged such that, in the plural image display mode, a longitudinal axis direction of liquid crystal molecules forms an angle of not less than 40° and not more than 50° with said pair of substrates.

In the display switching means, when the longitudinal axis direction of the liquid crystal molecules forms an angle of 45° with the surfaces of the substrates, the longitudinal axis direction of the liquid crystal molecule projected in oblique direction forms an angle of 45° with the polarizing direction of the incident light. In this case, when viewed in oblique direction, suitable birefringence occurs in the liquid crystal molecules so that the polarizing direction of the light having passed through the liquid crystal layer is changed and the light does not pass through the second polarizing means. An image displayed by the display device can therefore be suitably hidden.

Therefore, in the plural image display mode, when viewed in a particular direction, another image suitably overlaps the displayed image so that the displayed image is hidden, by such an arrangement that the longitudinal axis direction of the liquid crystal molecules forms an angle of not less than 40° and not more than 50° with the surfaces of the substrates. This makes it possible to further improve capability of changing the viewing angle in accordance with the situations.

A viewing angle control device of the present invention, which controls a viewing angle of incident light and outputs the incident light, and which also detects a contacting position of a contacting object on a surface of a device, includes: a liquid crystal element; a linear polarization plate provided on the liquid crystal element; and a position detection element, the liquid crystal element including an opposing transparent electrode, when the contacting object contacts, the position detection element detecting the contacting position of the contacting object by detecting currents flowing from plural parts of the opposing transparent electrode, a longitudinal axis direction of liquid crystal molecules in the liquid crystal element being in parallel to a plane formed by (i) a direction of either a transmission axis or an absorption axis of the linear polarization plate and (ii) a traveling direction of light, and the liquid crystal molecules being either: in parallel to or orthogonal to the traveling direction of the light; or tilted with respect to the traveling direction of the light.

The display device with the aforesaid functions is constructed by attaching the viewing angle control device above to a generally-used display device.

It is noted that the word "parallel" includes not only a case of precise parallelism but also substantial parallelism on condition that an effect similar to the case of precise parallelism is achieved. It is also noted that the word "vertical" includes not only a case of precise verticality but also substantial verticality on condition that an effect similar to the case of precise verticality is achieved.

An electronic device of the present invention includes the aforesaid display device or viewing angle control device.

This makes it possible to provide an electronic device which achieves, with a simple arrangement, a high display quality and can hide, by mode switching, a displayed image when viewed in a particular direction.

For a fuller understanding of the nature and advantages of the invention, reference should be made to the ensuing detailed description taken in conjunction with the accompanying drawings.

BRIEF DESCRIPTION OF THE DRAWINGS

FIG. 5(*b*) is a cross sectional view of the display section of FIG. 5(*a*) which is cut along the line A-A'.

FIG. 5(*c*) is a cross sectional view of the display section of FIG. 5(*a*) which is cut along the line B-B'.

FIG. 8(a) shows a display section when a mobile phone of another embodiment of the present invention is set in the single image display mode, and is a cross sectional view of the display section of FIG. 5(a) which is cut along the line A-A'.

FIG. 8(b) shows a display section when the mobile phone of said another embodiment of the present invention is set in the single image display mode, and is a cross sectional view of the display section of FIG. 5(a) which is cut along the line B-B'.

FIG. 20 is a block diagram of position detection means of the mobile phone of said another embodiment of the present invention.

DETAILED DESCRIPTION OF THE PREFERRED EMBODIMENTS

Embodiment 1

The following will describe an embodiment of the present invention with reference to FIGS. 1-19.

Figure 2:
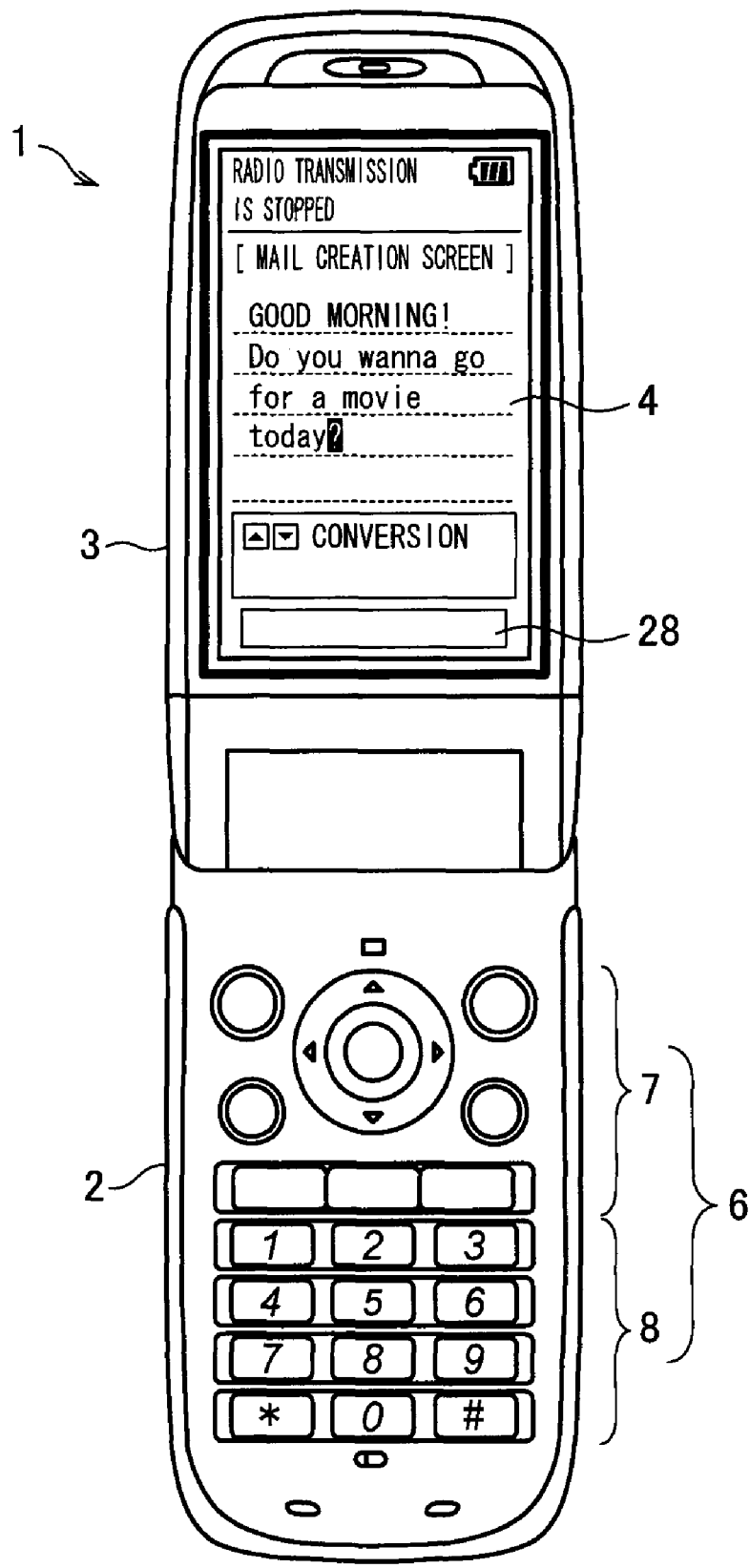
FIG. 2 is a frontal view of the mobile phone of the embodiment of the present invention.

FIG. 2 shows the exterior appearance of a mobile phone (electronic device) 1 of an embodiment of the present invention. The mobile phone 1 of the present embodiment, which is a so-called clamshell type, is opened in the figure. Since the illustrated surface is hidden inside when the mobile phone 1 is closed and is on the side that the user mainly use when the mobile phone 1 is opened, this surface shown in FIG. 2 is termed a front surface in the present embodiment.

As shown in FIG. 2, the mobile phone 1 is constituted by a main body 2 and a cover 3. The main body 2 is hinged with the cover 3. On the front surface of the cover 3, a display section (display device) 4 is provided.

The front surface of the main body 2 is provided with main operation buttons 6. The main operation buttons 6 are constituted by: function buttons 7 for various settings and function switching in the mobile phone 1; and input buttons 8 for inputting characters such as numbers and texts. More specifically, the function buttons 7 include: a power button for switching on/off the power of the mobile phone; a camera button for activating a photography mode; an e-mail button for activating an e-mail mode; a cross key for moving a selected object to upward, downward, leftward, and rightward; and a confirmation button which is provided at the center of the cross button and used for confirming various selections. On the other hand, the input buttons 8 are numeric keys.

The mobile phone 1 of the present embodiment has a touch sensor capability in the display section 4. The touch sensor capability allows the user to freely call various functions only by touching the screen by using a pen or a finger (i.e. a contacting object). Therefore, for example, some of the aforesaid main operation buttons 6 can be operated by a touch sensor 28 in the display section 4, instead of pushing the buttons. Furthermore, for example, below-described setting (switching) of a narrow viewing angle mode and a wide viewing angle mode can be set by the touch sensor 28, instead of pushing the button. To achieve this, there is provided position detection means (not illustrated) which detects, when a contacting object contacts, currents from plural positions of the below-mentioned first transparent conductive film with which the contacting object contacts, so as to detect the contacting position of the contacting object based on the detection result. Details of the touch sensor capability will be given later.

The mobile phone 1 of the present embodiment is arranged in such a manner that, when a main image such as a body text of e-mail and a photographic image is displayed on the display section 4, another image is viewed on the display section 4 from the user's surroundings (i.e. those who are around the mobile phone 1 but are not the user of the mobile phone 1). Hereinafter, the mode in which a body text of e-mail or a photographic image displayed on the display section 4 cannot be viewed from the surroundings as described above is termed a narrow viewing angle mode (plural image display mode). On the other hand, the mode in which the main image on the display section 4 can be viewed from any angles is termed a wide viewing angle mode (single image display mode). The user can optionally set these narrow viewing angle mode and wide viewing angle mode by operating the operation buttons.

Figure 3:
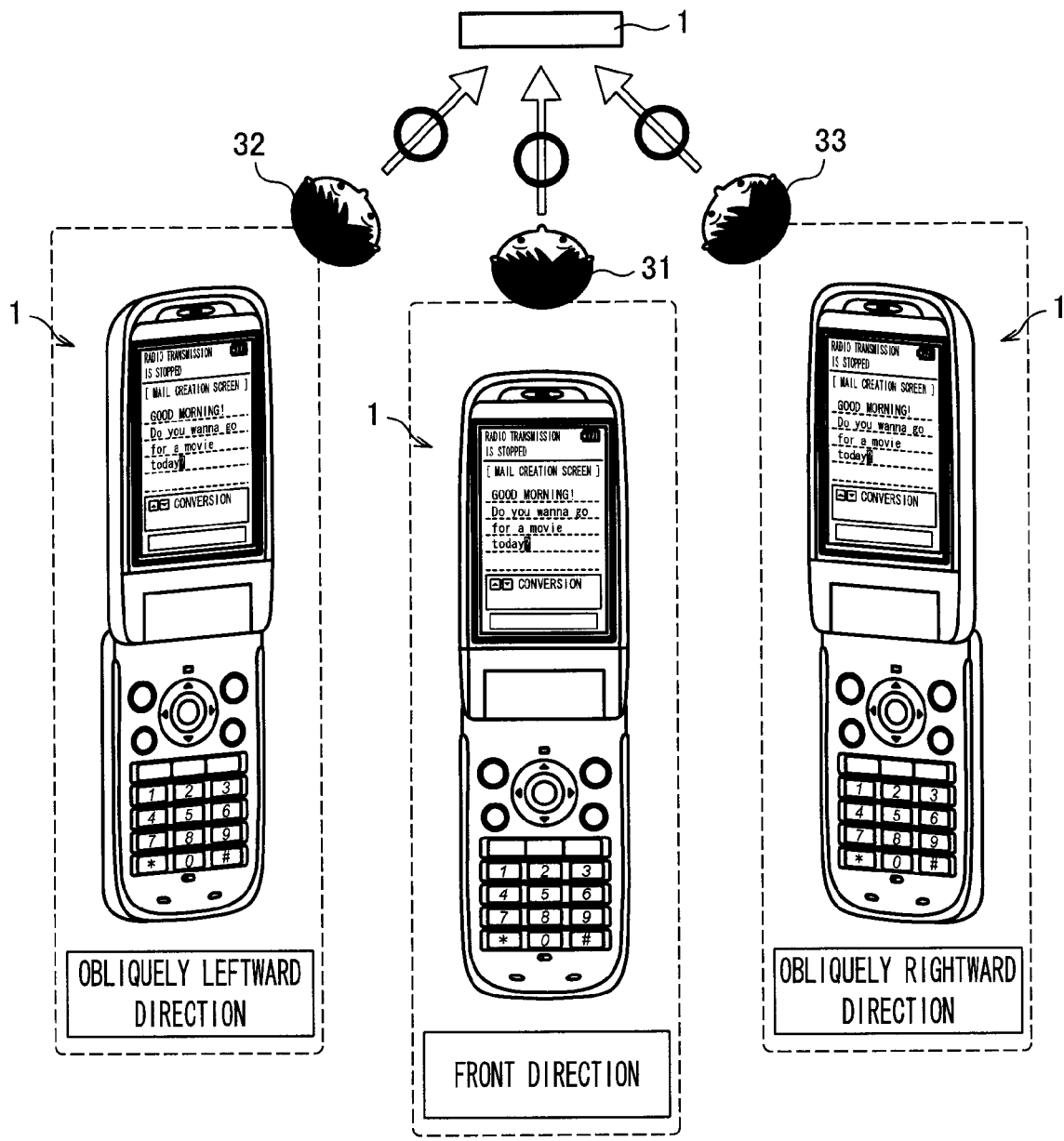
FIG. 3 illustrates the state of a display section which is viewed at a right angle or at an oblique angle, when the mobile phone of the embodiment of the present invention is set in a single image display mode.
Figure 4:
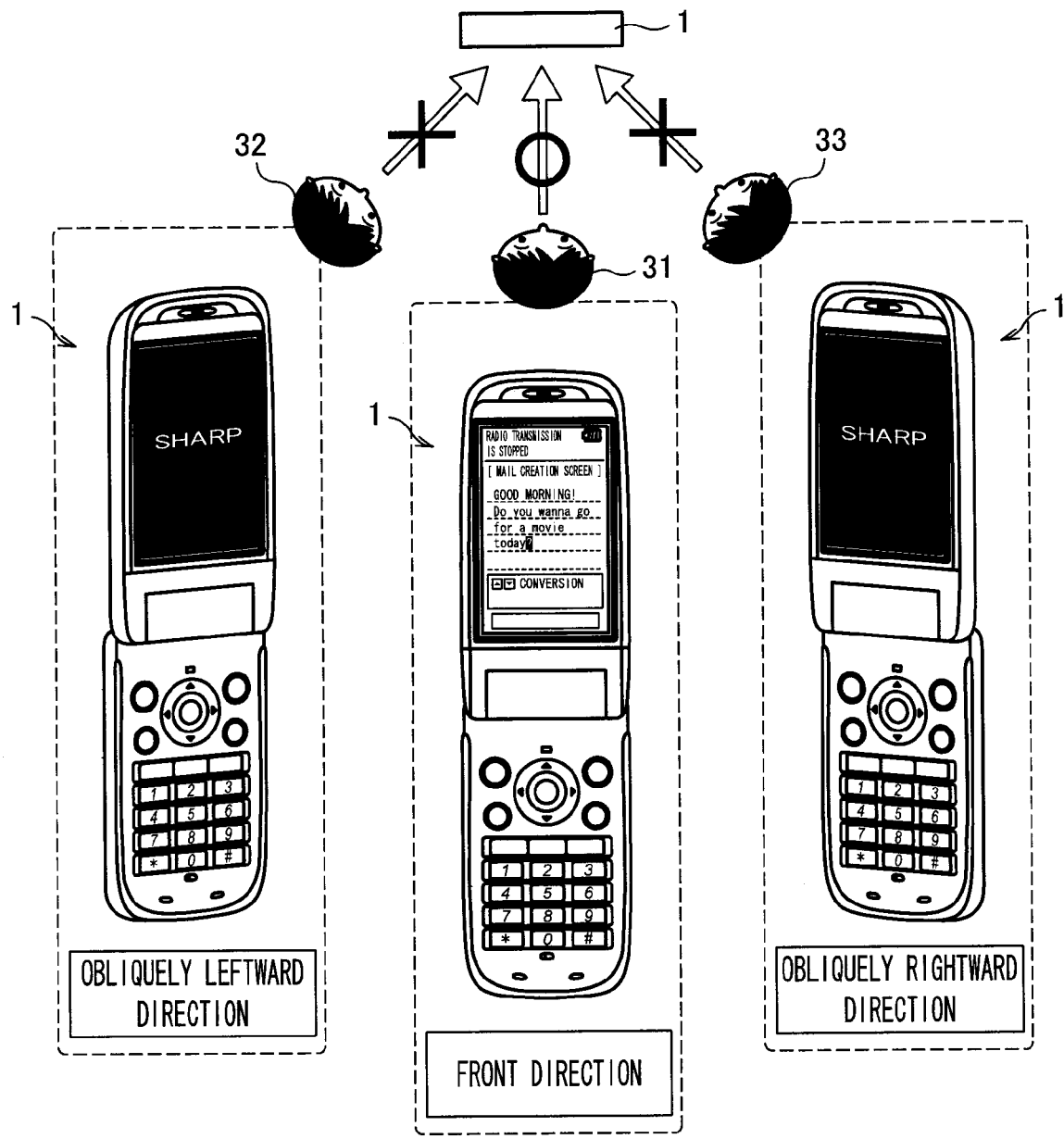
FIG. 4 illustrates the state of the display section which is viewed at a right angle or at an oblique angle, when the mobile phone of the embodiment of the present invention is set in a plural image display mode.

As shown in FIG. 3, in the wide viewing angle mode, a main image can be viewed from right in front of the display section 4 (the front direction in FIG. 3), from obliquely rightward of the front surface of the display section 4 (obliquely rightward direction in FIG. 3), and from obliquely leftward of the front surface of the display section 4 (obliquely leftward direction in FIG. 3). In the meanwhile, in the narrow viewing angle mode, as shown in FIG. 4, while the main image is viewed from right in front of the display section 4, a switching image in which a "SHARP" logo is placed on the solid black background is viewed in obliquely rightward direction and obliquely leftward direction.

The following will give details of the display section 4.

Figure 1:
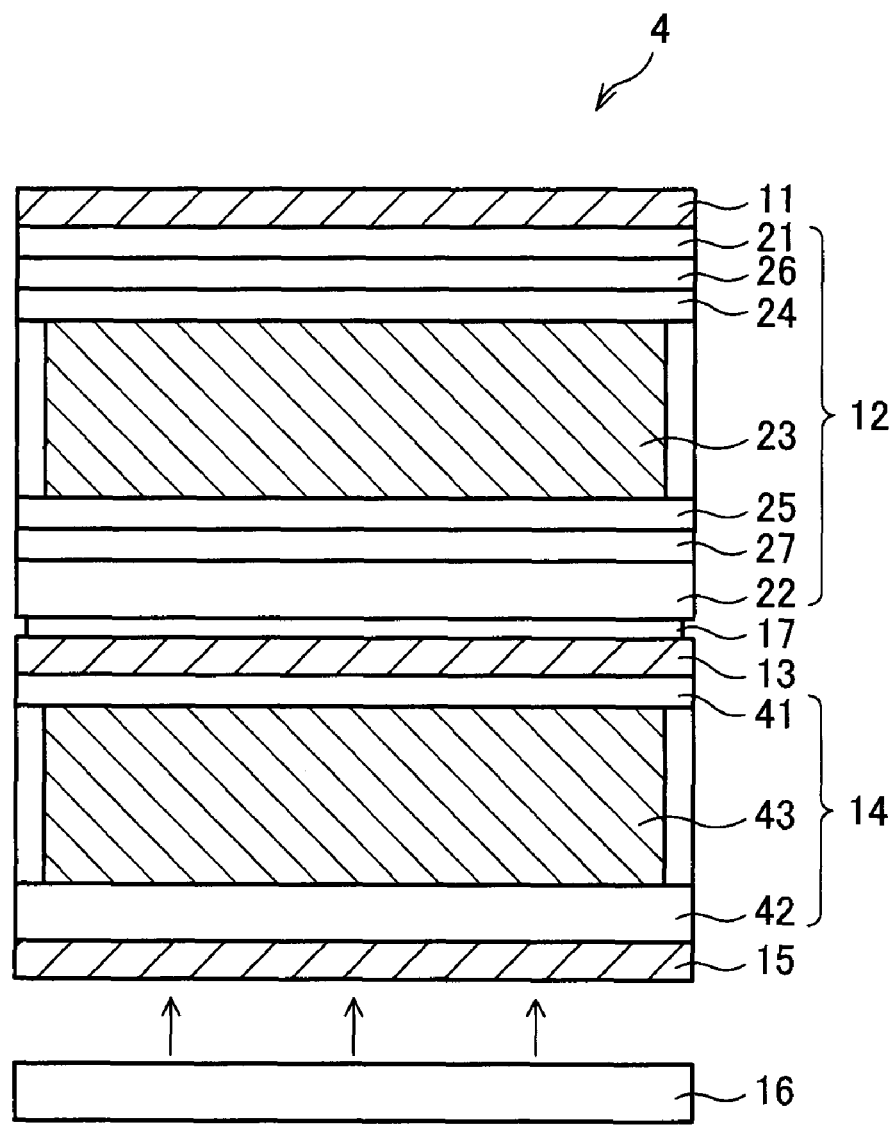
FIG. 1 is a cross sectional view of a display section of a mobile phone of an embodiment of the present invention.

FIG. 1 shows a cross sectional view of the display section 4. In the display section 4, the following members are deposited in this order: a second polarizing plate (second polarizing means, linear polarization plate) 11; a switching liquid crystal display section (display switching means, liquid crystal element; hereinafter, SW-LCD) 12; a first polarizing plate (first polarizing means) 13; a main liquid crystal display section (image display means; hereinafter, main LCD) 14; and a third polarizing plate (third polarizing means) 15. On the third polarizing plate 15 side, a backlight 16 is further provided.

The polarization transmission axis of the first polarizing plate 13 and the polarization transmission axis of the second polarizing plate 11 are preferably in parallel to each other. The axis of the first polarizing plate 13, however, may be optionally determined in accordance with the characteristics of the main LCD. In such a case, an effect, which is similar to that of a case where the polarization transmission axis of the first polarizing plate 13 and the polarization transmission axis of the second polarizing plate 11 are in parallel to each other, can be obtained such that the polarization direction of linearly polarized light having passed through the first polarizing plate 13 with an optional axis angle is appropriately rotated by a λ/2 plate or the like in such a way as to conform to the transmission axis of the second polarizing plate 11.

The second polarizing plate 11 is pasted on the SW-LCD 12. The first polarizing plate 13 and the third polarizing plate 15 are pasted on the respective surfaces of the main LCD 14. The surface of the SW-LCD 12, to which the second polarizing plate 12 is not pasted, is connected to the main LCD 14 with the first polarizing plate 13 and an adhesive layer 17 being interposed therebetween. The SW-LCD 12 and the second polarizing plate 11 pasted thereon function as a viewing angle control device. The adhesive layer 17 may be adhered by a resin adhesive which is a thermosetting type or a ultraviolet curing type, or may be fixed by using a so-called double-sided tape. The pasting area may be an entire surface or a part of the surface, e.g. the frame thereof.

In the main LCD 14, a liquid crystal layer 43 is enclosed between transparent electrode substrates 41 and 42. A voltage is applied to the transparent electrode substrates 41 and 42 under the control of a control section (not illustrated) so that the alignment of liquid crystal molecules in the liquid crystal layer 43 is changed, with the result that images such as an operation screen of the mobile phone 1, a photograph, and a body text of e-mail are displayed. The main LCD 14 is a publicly-known liquid crystal display device. For example, it is possible to use liquid crystal display devices with various modes, e.g. a TN (Twisted Nematic) liquid crystal display device driven by active matrix driving and a VA (Vertical Alignment) liquid crystal display device. Instead of the main liquid crystal display section 14, a self-luminous display such as an organic EL (Electroluminescence) display device and a plasma display device may be used. When such a self-luminous display is adopted, backlight is unnecessary.

In the SW-LCD 12, the following members are formed in this order: a substrate (first substrate) 21; a first transparent electrode film (first transparent conductive film) 26; an alignment film 24, a liquid crystal layer 23, an alignment film 25, a second transparent electrode film (second transparent conductive film) 27, and a substrate (second substrate) 22. The initial alignment of liquid crystal molecules in the liquid crystal layer 23 is determined in accordance with the alignment films 25 and 27. The alignment is changed in response to voltage application to the first transparent electrode film 26 and the second transparent electrode film 27 under the control of a control section (not illustrated). In the SW-LCD 12, switching between the narrow viewing angle mode and the wide viewing angle mode is carried out by the aforesaid change in the alignment.

Between the substrates 21 and 22, the liquid crystal layer 23 is provided. A voltage is applied to the first transparent electrode film 26 and the second transparent electrode film 27 under the control of the control section (not illustrated) so that the alignment of the liquid crystal molecules in the liquid crystal layer 23 is changed, with the result that an image is displayed. The control section changes the alignment of the liquid crystal molecules in the liquid crystal layer 23, in accordance with the wide viewing angle mode or the narrow viewing angle mode which is set by the user. Alternatively, only one of the alignment films 24 and 25 may be provided.

The backlight 16 supplies light for image display. The third polarizing plate 15 obtains linearly polarized light with a certain direction, from the light which has been emitted from the backlight 16 and has not entered the main LCD 14. The first polarizing plate 13 obtains linearly polarized light with a certain direction, from the light which has passed through the main LCD 14 and has not entered the SW-LCD 12. The second polarizing plate 11 obtains linearly polarized light with a certain direction, from the light having passed through the main LCD 14 and the SW-LCD 12.

Regarding changes in the alignment of the liquid crystal molecules in the SW-LCD, the following will describe examples of liquid crystal molecule alignments of four SW-LCDs with reference to FIGS. 5-10.

Example 1 of Liquid Crystal Molecule Alignment of SW-LCD

Figure 5:
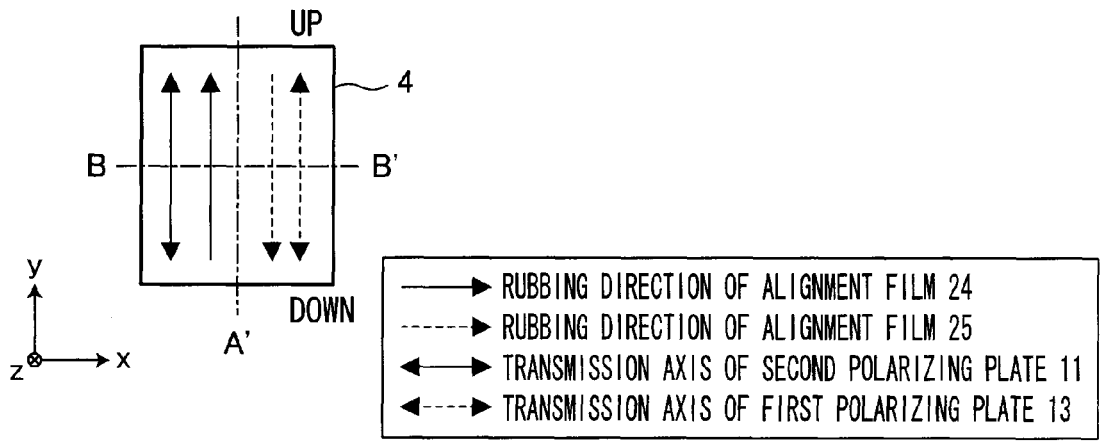
FIG. 5(*a*) is a plan view of the display section when the mobile phone of the embodiment of the present invention is set in the single image display mode.
Figure 5:
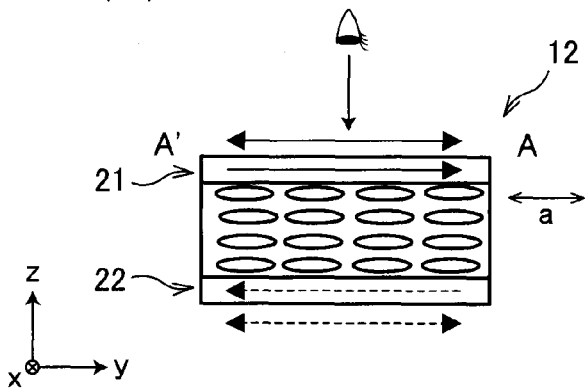
Figure 5:
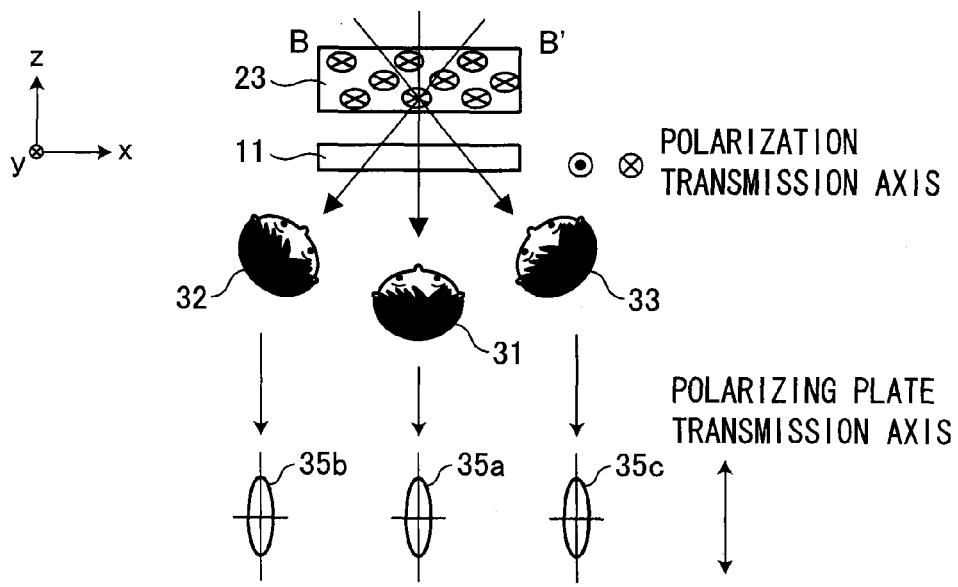

FIG. 5(a) shows a display screen on the display section 4 of the mobile phone 1. In the figure, the vertical direction in the figure corresponds to the vertical direction of an image on the main LCD 14. Hereinafter, the horizontal direction on the display image (i.e. horizontal direction on the figure) is termed x direction, the vertical direction on the display image (i.e. vertical direction on the figure) is termed y direction, and the direction along the thickness of the display section 4 is termed z direction. In FIGS. 5(a)-10(b), the first transparent electrode film 26, the second transparent electrode film 27, and the alignment films 24 and 25 are omitted for the sake of simplicity.

According to FIG. 5(a), first, the polarization transmission axes of the second polarizing plate 11 and the first polarizing plate 13 are provided along the y direction. The rubbing directions of the alignment films 24 and 25 are made so as to be in parallel to the polarization transmission axes of the first polarizing plate 11 and the second polarizing plate 13 and to be opposite to each other for 180 degrees. As a result, the alignment has an antiparallel structure. The alignment films 24 and 25 are made of a polyimide material which has horizontal alignment, so that liquid crystal molecules are aligned to be in parallel to the substrates 21 and 22. As a result, the longitudinal directions of the liquid crystal molecules are in uniaxial alignment so as to be in parallel to the aforesaid polarization transmission axes. It is noted that the word "parallel" includes not only a case of precise parallelism but also substantial parallelism on condition that an effect similar to the case of precise parallelism is achieved. It is also noted that the word "vertical" includes not only a case of precise verticality but also substantial verticality on condition that an effect similar to the case of precise verticality is achieved.

In the case above, as shown in the cross section cut along the line A-A' in FIG. 5(a), the liquid crystal molecules of the SW-LCD 12 are in uniaxial alignment so as to be in parallel to the polarization transmission axis of the first polarizing plate 13. Since the light emitted from the backlight 16 and entering the SW-LCD 12 via the main LCD 14 passes through the first polarizing plate 13, the polarizing direction of the light entering the SW-LCD 12 is identical with or substantially identical with the alignment a of the liquid crystal molecules. Hereinafter, the phrase "identical with or substantially identical with" will be simply referred to as "identical with".

FIG. 5(c) show how the liquid crystal molecules look when the SW-LCD 12 in the state above are viewed from a position deviated toward the x direction. According to the figure, the shape (of the liquid crystal molecule viewed by the viewer 31) when the liquid crystal molecule is projected in front direction is indicated by a liquid crystal molecule 35a. In this case, the longitudinal axis is in parallel to the polarizing direction of incident light. When the longitudinal axis of the projected liquid crystal molecule forms an angle of 0° with the polarizing direction of the incident light, the incident light passes through without the influence of birefringence. An image on the main LCD 14 can therefore be viewed in this case. Similarly, the shapes (of the liquid crystal molecule viewed by the viewers 32 and 33) when the liquid crystal molecule is projected from positions deviated in x direction are indicated by liquid crystal molecules 35b and 35c. Also in these cases, the longitudinal axes are in parallel to the polarizing direction of the incident light. An image on the main LCD 14 can therefore be viewed. In short, an image on the main LCD 14 can be viewed in any directions. This state, i.e. in a state in which no voltage application is done is used as the wide viewing angle mode.

On the other hand, in the narrow viewing angle mode, an alternating voltage (e.g. 100 HZ and 3V) is applied by a first circuit (not illustrated) to the first transparent electrode film 26 and the second transparent electrode film 27 to which no voltage application has not been done, in such a manner as to cause the liquid crystal molecules to rotate around the axis along the x direction, for 45° with respect to the substrates 21 and 22. FIGS. 7(a) and 7(b) show the state of the liquid crystal molecules in the case above. FIG. 7(a) is a cross section cut along the line A-A' as in the case of FIG. 5(b), and shows that the liquid crystal molecules are inclined for 45° with respect to the substrates 21 and 22. FIG. 7(b) is a cross section cut along the line B-B' as in the case of FIG. 5(c). In this figure, the liquid crystal molecules are inclined for about 45° with respect to the normal line of the figure.

In the case above, as shown in FIG. 7(b), the liquid crystal molecule viewed by the viewer 31, i.e. the projection of the liquid crystal molecule in front direction is indicated by a liquid crystal molecule 36a. Since the alignment of the liquid crystal molecules is changed in line with the rotation around the x axis, the polarizing directions of the second polarizing plate 11 and the first polarizing plate 13 are always identical with the longitudinal axis direction of the liquid crystal molecule 36a. On this account, in front direction (i.e. when viewed by the viewer 31 in FIG. 7(b)), an image on the main LCD 14 is viewed without the influence of birefringence.

On the contrary, the projection of a liquid crystal molecule viewed by the viewer 31 positioned to the left side of the display section 4, i.e. a plan of a liquid crystal molecule projected from the left side of the substrates 21 and 22 is indicated by a liquid crystal molecule 36b. In this case, the polarizing directions of the second polarizing plate 11 and the first polarizing plate 13 form an angle with the longitudinal axis direction of the liquid crystal molecule projection (liquid crystal molecule 36b). On this account, the longitudinal axis direction of the liquid crystal molecule projection forms an angle with the polarizing direction of the incident light. The viewer 32 cannot therefore view an image on the main LCD 14, because the SW-LCD 12 does not allow the light to transmit on account of the birefringence of the liquid crystal.

Similarly, the projection of a liquid crystal molecule viewed by the viewer 31 positioned to the right side of the display section 4, i.e. a plan of a liquid crystal molecule projected from the right side of the substrates 21 and 22 is indicated by a liquid crystal molecule 36c. Since the polarizing directions of the second polarizing plate 11 and the first polarizing plate 13 form an angle with the longitudinal axis direction of the projection, the longitudinal axis direction of the liquid crystal molecule projection forms an angle with the polarizing direction of the incident light, and the polarizing direction rotates. The viewer 33 cannot therefore view an image on the main LCD 14 because the SW-LCD 14 does not allow the light to transmit on account of birefringence of the liquid crystal.

Because of the above, when a voltage is applied to the first transparent electrode film 26 and the second transparent electrode film 27, as shown in FIG. 4, an image on the main LCD 14 is viewable without the influence of birefringence if the display section 4 is viewed in front direction (i.e. viewed by the viewer 31), but the image on the main LCD 14 is not viewable in directions other than the front direction (i.e. for the viewers 32 and 33) because the SW-LCD does not allow the light to transmit on account of the influence of birefringence.

The alignment of liquid crystal molecules in the narrow viewing angle mode is not always required to form an angle of 45° with the substrates 21 and 22. The angle may be optionally determined on condition that the alignment is not in parallel to the substrates 21 and 22. That is to say, the angle is required to be larger than the angle at which the alignment is in parallel to the substrates 21 and 22 and smaller than the angle at which the alignment is orthogonal to the substrates 21 and 22. (In other words, the angle is required to be larger than 0° and smaller than 90°.) The angle is preferably not smaller than 10° and not larger than 80°, and more preferably not smaller than 40° and not larger than 50°. This is because birefringence increases as the angle gets close to 45° and an image is suitably hidden. Meanwhile, when the angle is small, the power consumption is reduced because a required drive voltage is small.

In case where the viewer is deviated in y direction, since no change occurs in the longitudinal axis direction of the liquid crystal molecule projection, whether or not an image on the main LCD 14 is viewable depends only on the deviation of the viewpoint in x direction. On this account, the sight line in the direction in parallel to a yz plane (which is drawn by the rotation of a point on a liquid crystal molecule, by which rotation the alignment of the liquid crystal molecule is changed) is determined as the sight line in front direction.

Figure 6:
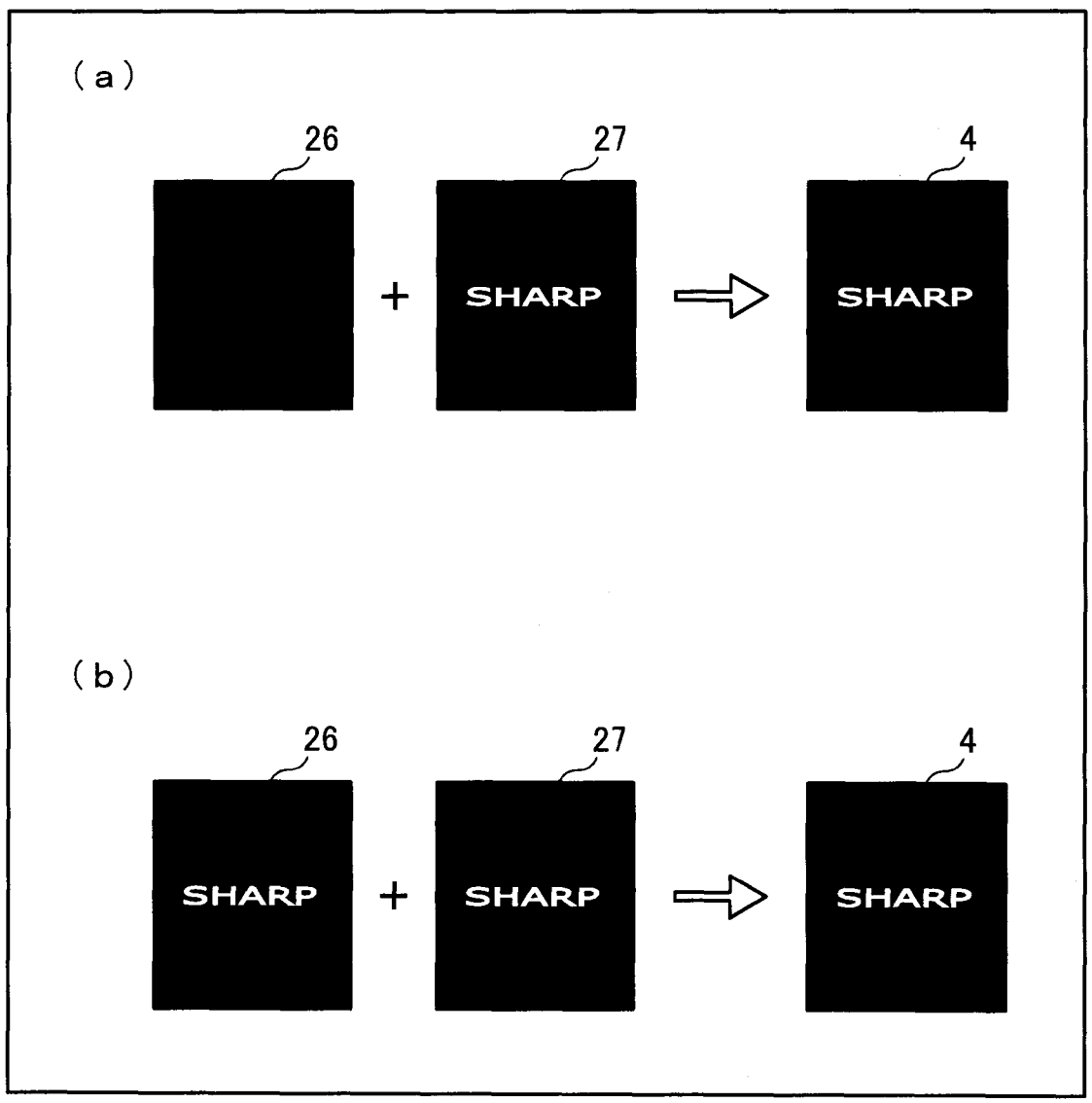
FIG. 6 illustrates images to be viewed when a first transparent electrode film and a second transparent electrode film which are provided on the display section of the embodiment of the present invention are set in the plural image display mode.
Figure 7:
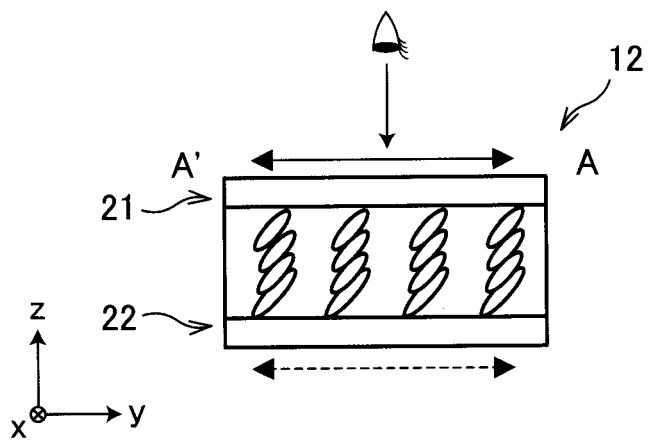
FIG. 7(a) shows the display section when the mobile phone of the embodiment of the present invention is set in the plural image display mode, and is a cross sectional view of the display section of FIG. 5(a) which is cut along the line A-A'.
FIG. 7(b) shows the display section when the mobile phone of the embodiment of the present invention is set in the plural image display mode, and is a cross sectional view of the display section of FIG. 5(a) which is cut along the line B-B'.
Figure 7:
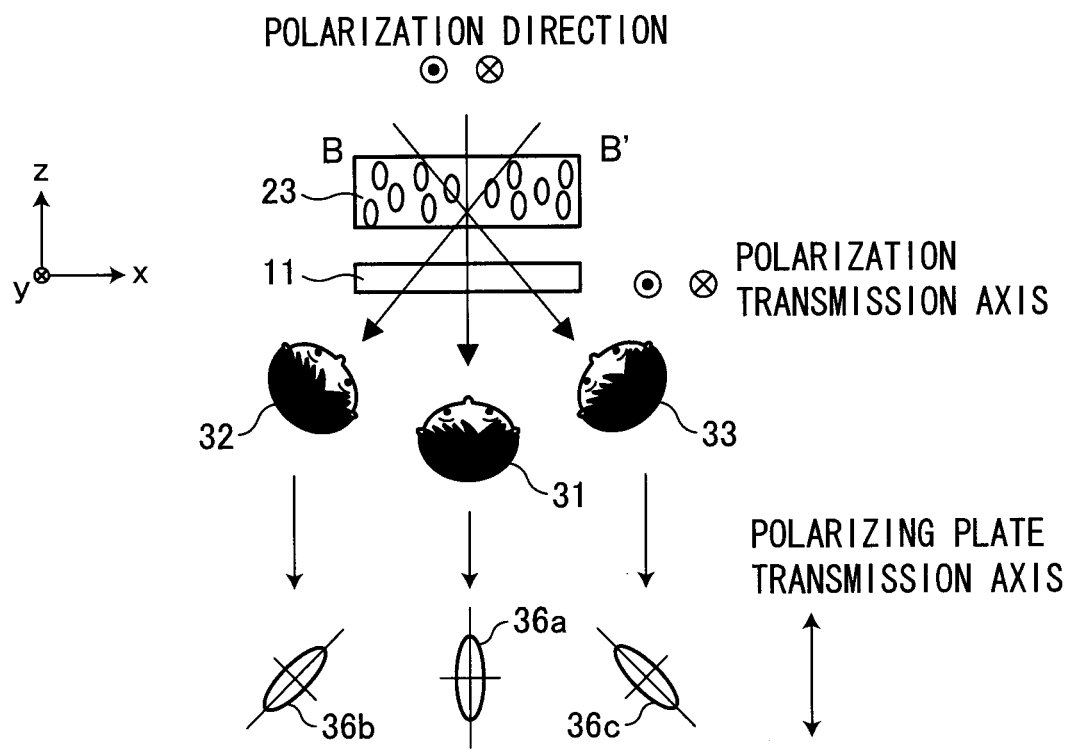
Figure 9:
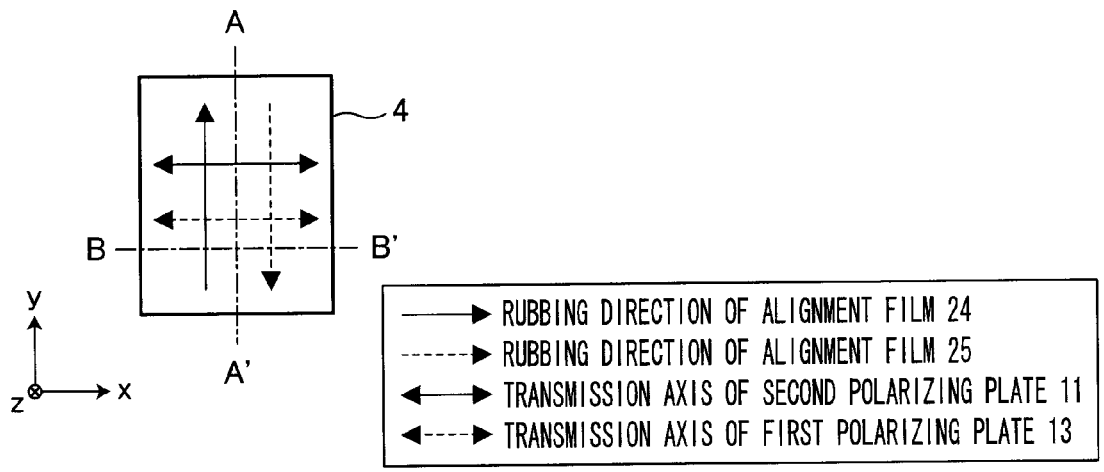
FIG. 9(a) is a plan view of the display section when the mobile phone of said another embodiment of the present invention is set in the single image display mode.
FIG. 9(b) is a cross section of the display section of FIG. 9(a) which is cut along the line A-A'.
FIG. 9(c) is a cross section of the display section of FIG. 9(a) which is cut along the line B-B'.
Figure 9:
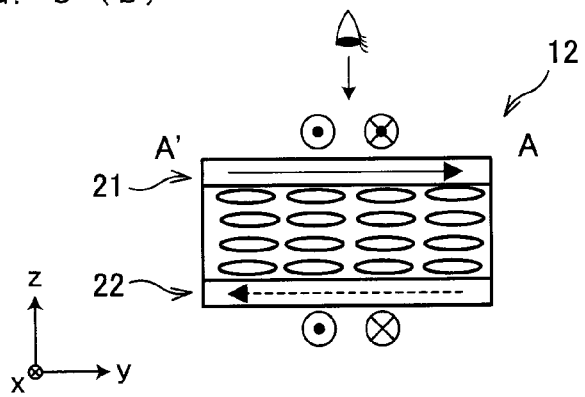
Figure 9:
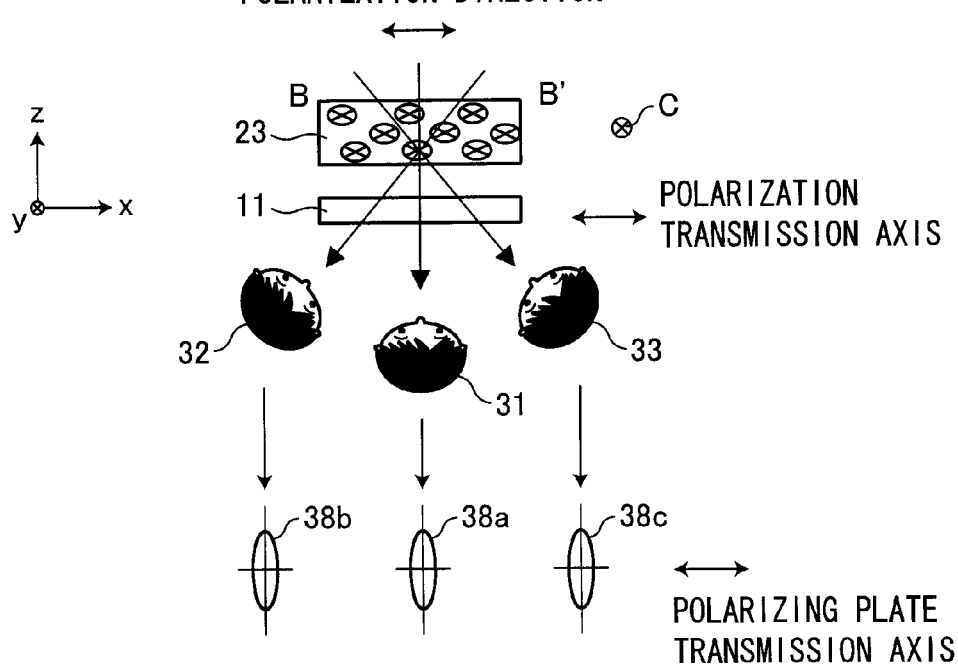

The second transparent electrode film 27 ((a) in FIG. 6) may have an electrode which is patterned so as not to overlap the white "SHARP" logo, i.e. to cover the black parts. Since no voltage is applied to liquid crystal molecules in the logo parts where a voltage is not applied to the second transparent electrode film 27, the alignment of the liquid crystal molecules is in parallel to the substrates 21 and 22 as in the case of no voltage application. The logo parts are therefore not influenced by the birefringence in the SW-LCD 12, in any directions. On this account, images that the viewers 32 and 33 view are arranged so that light is blocked in the parts other than the log parts whereas light passes through the logo parts. As a result, the logo image on the display section 4 shown in FIG. 6(a) is obtained.

To hide an image on the main LCD 14, the pattern electrode preferably covers not less than 60% of the display section 4, more preferably covers not less than 80% of the display section 4. The pattern electrode can be arranged in any manner, to only cause an image on the main LCD 14 to overlap an image on the SW-LCD 12.

In addition, the display section 4 of the present embodiment has a touch sensor capability as details thereof will be given later, and the first transparent electrode film 26 is used as a touch panel. Therefore, the first transparent electrode film 26 with the aforesaid electrode patterning has a part which does not function as a touch panel. In consideration of this, the electrode patterning is preferably formed on the second transparent electrode film 27, when the aforesaid logo image is formed. However, in case where only a predetermined area of the first transparent electrode film 26 is used as a touch panel instead of the entire surface, the electrode patterning may be formed on areas of the first transparent electrode film 26 other than the predetermined area. In this case, the electrode patterning may be formed only on the first transparent electrode film 26 or on both the first transparent electrode film 26 and the second transparent electrode film 27 as shown in (b) in FIG. 6.

Example 2 of Liquid Crystal Molecule Alignment of SW-LCD

An example 2 of the liquid crystal molecule alignment of the SW-LCD will be discussed with reference to FIG. 8. Used in the example 2 of the liquid crystal molecule alignment of the SW-LCD shown in FIG. 8 is an SW-LCD 12' which adopts alignment films made of a vertically-aligned polyimide material, instead of the alignment films 24 and 25 used in the above-described example 1 of the liquid crystal molecule alignment of the SW-LCD. With this, as shown in FIG. 8(a), liquid crystal molecules are aligned to be orthogonal to the surfaces of the substrates 21 and 22.

In this case, when no voltage is applied, the liquid crystal molecules of the SW-LCD 12' are in uniaxial alignment so as to be orthogonal to the substrates 21 and 22. In FIG. 8(b), therefore, the liquid crystal molecule 37a looks like a perfect circle from right in front (i.e. for the viewer 31). When viewed in directions other than the front direction, the longitudinal axes are in parallel to the x direction as the liquid crystal molecules 37b and 37c indicate. Therefore, the longitudinal axis direction b forms an angle of 90° with the polarizing direction of the incident light, whatever the direction of the projection is (inclusive of the front direction). When the longitudinal axis direction of the liquid crystal molecule projection forms an angle of 90° (right angle) with the polarizing direction of the incident light, the incident light passes through without being influenced by birefringence. On this account, an image on the main LCD 14 can be viewed in all directions. This state, i.e. a state of no voltage application, is set as the wide viewing angle mode.

On the other hand, in the narrow viewing angle mode, an alternating voltage is applied to the first transparent electrode film 26 and the second transparent electrode film 27 so that the liquid crystal molecules in the wide viewing angle mode rotates around the x axis to form an angle of 45° with the substrates 21 and 22. In this case, the liquid crystal molecules are arranged to be identical with those of the example 1 shown in FIG. 7.

Therefore, in a similar manner as above, when a voltage is applied to the first transparent electrode film 26 and the second transparent electrode film 27, as shown in FIG. 4, an image on the main LCD 14 is viewable without the influence of birefringence if the display section 4 is viewed in front direction (i.e. viewed by the viewer 31), but a logo image is viewed in directions other than the front direction (i.e. for the viewers 32 and 33) because of the influence of birefringence.

Example 3 of Liquid Crystal Molecule Alignment of SW-LCD

FIG. 9(a) shows the display section 4 of the mobile phone 1. In the figure, the vertical direction of the displayed image corresponds to the vertical direction of the figure.

First, as shown in FIG. 9(a), the first polarizing plate 13 and the second polarizing plate 11 are arranged so that the polarization transmission axes thereof are in parallel to the x direction. The rubbing directions of the alignment films 24 and 25 are arranged to be orthogonal to the polarization transmission axes of the first polarizing plate 13 and the second polarizing plate 11 (i.e. the rubbing directions are in parallel to the y direction), and to be opposite to each other for 180 degrees. As a result, the alignment has an antiparallel structure. The alignment films 24 and 25 are made of a horizontally-aligned polyimide material, and the liquid crystal molecules are aligned to be in parallel to the substrates 21 and 22. Therefore, as shown in FIG. 9(b), the longitudinal axis direction of the liquid crystal molecules is in uniaxial alignment so as to be orthogonal to the polarization transmission axes of the polarizing plates.

In the case above, as shown in FIG. 9(b), with no voltage application, the liquid crystal molecules of the SW-LCD 12 are in uniaxial alignment so as to be in parallel to the substrates 21 and 22 and orthogonal to the polarization transmission axis of the first polarizing plate 13. Since the light emitted from the back light 16 and having passed through the main LCD 14 passes through the first polarizing plate 13, the polarizing direction of the light entering the SW-LCD 12 forms a right angle with the alignment direction of the liquid crystal molecules. FIG. 9(c) shows how the liquid crystal molecule looks when the above-described SW-LCD 12 is viewed from positions deviated in x direction. In the figure, the shape of the liquid crystal molecule (viewed by the viewer 31) projected in front direction is indicated by a liquid crystal molecule 38a. In this case, the longitudinal axis direction c of the projected liquid crystal molecule forms a right angle with the polarizing direction of the incident light. When the longitudinal axis direction of a liquid crystal molecule projection forms an angle of 90° with the polarizing direction of incident light, the incident light passes through without being influenced by birefringence. On this account, an image on the main LCD 14 can be viewed from any angles. This state, i.e. a state of no voltage application, is set as the wide viewing angle mode.

Figure 10:
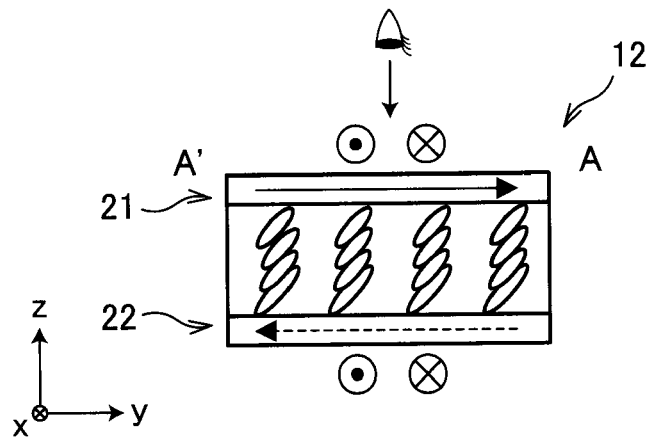
FIG. 10(a) shows the display section when the mobile phone of said another embodiment of the present invention is set in the plural image display mode, and is a cross section of the display section of FIG. 9(a) which is cut along the line A-A'
FIG. 10(b) shows the display section when the mobile phone of said another embodiment of the present invention is set in the plural image display mode, and is a cross section of the display section of FIG. 9(a) which is cut along the line B-B'.
Figure 10:
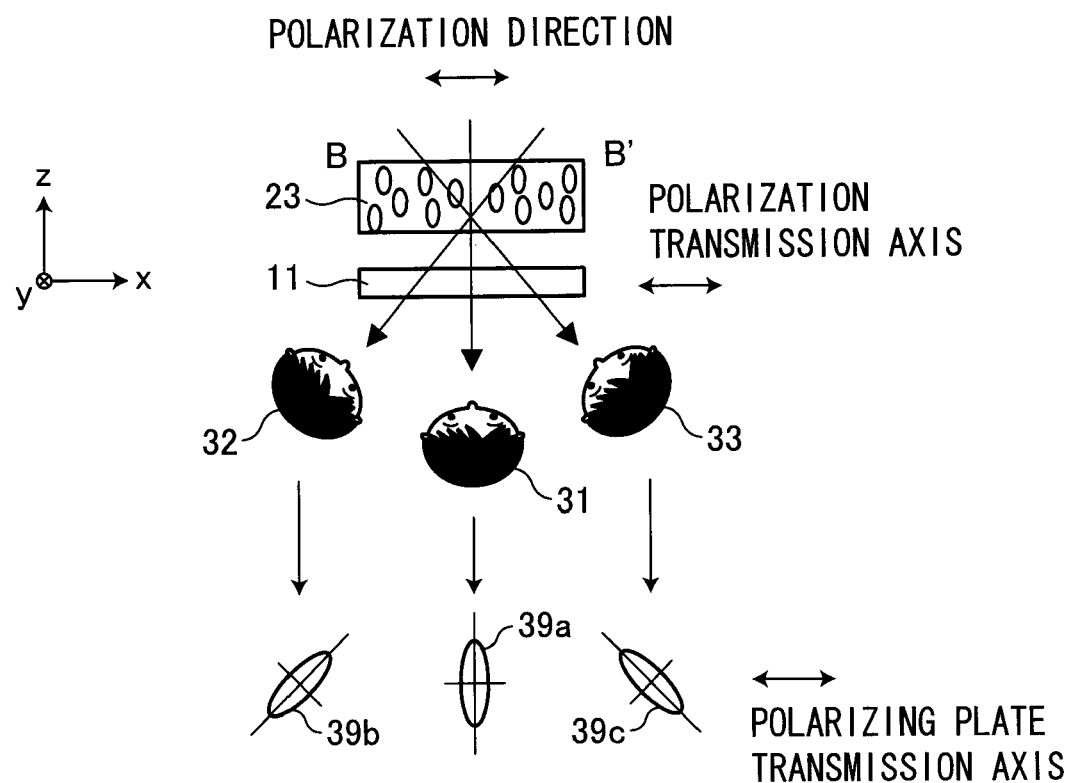

On the other hand, in the narrow viewing angle mode, an alternating voltage is applied to the first transparent electrode film 26 and the second transparent electrode film 27 by a first circuit (not illustrated) so that the liquid crystal molecules rotate around the x axis to form an angle of 45° with the substrates 21 and 22. The state of the liquid crystal molecules in this case is shown in FIGS. 10(*a*) and 10(*b*). FIG. 10(*a*) is a cross section which is cut along the line A-A' in FIG. 9(A), and shows that the liquid crystal molecules form an angle of 45° with the substrates 21 and 22. FIG. 10(*b*) is a cross section which is cut along the line B-B' in FIG. 9(A), and shows that the liquid crystal molecules form an angle of 45° with the normal line of the figure.

In the case above, as shown in FIG. 10(*b*), the projected shape of a liquid crystal molecule viewed by the viewer 31, i.e. a liquid crystal molecule in front direction, is indicated by a liquid crystal molecule 39*a*. Since the alignment of the liquid crystal molecules changes in line with the rotation around the x axis, the polarizing directions of the second polarizing plate 11 and the first polarizing plate 13 form a right angle with the longitudinal direction of the liquid crystal molecule 39*a*. On this account, the longitudinal axis direction of the liquid crystal molecule projection is substantially orthogonal to the polarizing direction of the incident light. An image on the main LCD 14 is therefore viewable in front direction (viewable for the viewer 31) because there is no influence of birefringence.

On the other hand, the projected shape of the liquid crystal molecule viewed by the user on the left side of the display section 4, i.e. the projected shape of the liquid crystal molecule from the leftward of the substrates 21 and 22 is indicated by a liquid crystal molecule 39*b*. Since the polarizing directions of the second polarizing plate 11 and the first polarizing plate 13 form an angle with the longitudinal axis direction of the projection, the longitudinal axis direction of the liquid crystal molecule projection also forms an angle with the polarizing direction of the incident light. The viewer 32 cannot therefore view an image on the main LCD 14, because the light does not pass through the SW-LCD 12 on account of birefringence of the liquid crystal.

In a similar manner, the projected shape of the liquid crystal molecule viewed by the user on the right side of the display section 4, i.e. the shape of the liquid crystal molecule projected from the right side toward the substrates 21 and 22 is indicated by a liquid crystal molecule 39*c*. Since the polarizing directions of the first polarizing plate 13 and the second polarizing plate 11 form an angle with the longitudinal axis direction of the projection, the longitudinal axis direction of the liquid crystal molecule projection also forms an angle with the polarizing direction of the incident light. Therefore, the viewer 33 cannot view an image on the main LCD 14 because the SW-LCD 12 does not allow the light to transmit on account of birefringence of the liquid crystal.

With the structure above, when a voltage is applied to the first transparent electrode film 26 and the second transparent electrode film 27, as shown in FIG. 4, an image on the main LCD 14 is viewable without the influence of birefringence if the display section 4 is viewed in front direction (i.e. viewed by the viewer 31), but the image on the main LCD 13 is not viewable in directions other than the front direction (i.e. viewed by the viewers 32 and 33), on account of the influence of birefringence.

Example 4 of Liquid Crystal Molecule Alignment of SW-LCD

Figure 11:
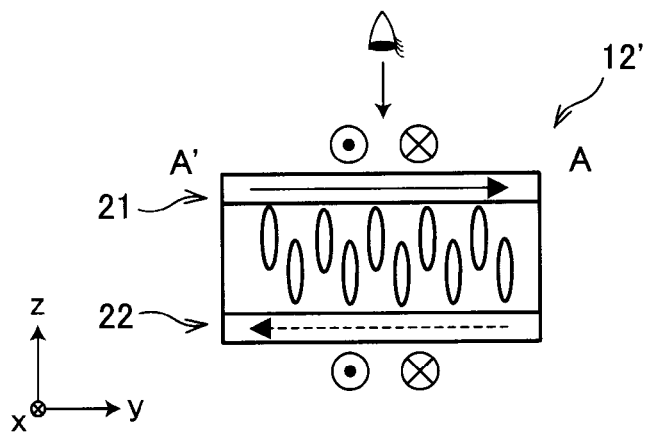
FIG. 11(a) shows the display section when the mobile phone of said another embodiment of the present invention is set in the single image display mode, and is a cross section of the display section of FIG. 9(a) which is cut along the line A-A'
FIG. 11(b) shows the display section when the mobile phone of said another embodiment of the present invention is set in the single image display mode, and is a cross section of the display section of FIG. 9(a) which is cut along the line B-B'.
Figure 11:
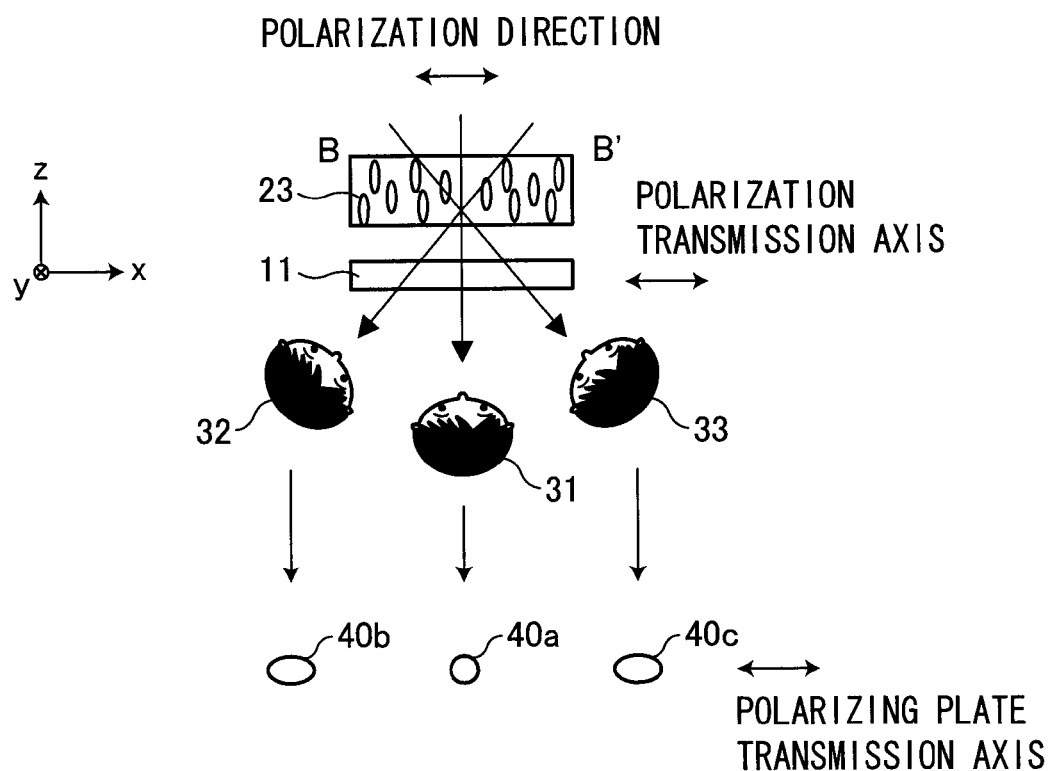

The following will describe an example 4 of the liquid crystal molecule alignment of the SW-LCD, with reference to FIG. 11. Used in the example 4 of the liquid crystal molecule alignment of the SW-LCD shown in FIG. 11 is an SW-LCD 12' which adopts alignment films made of a vertically-aligned polyimide material, instead of the alignment films 24 and 25 used in the above-described example 3 of the liquid crystal molecule alignment of the SW-LCD. With this, liquid crystal molecules are aligned to be orthogonal to the surfaces of the substrates 21 and 22.

In this case, with no voltage application, the liquid crystal molecules of the SW-LCD 12' are in uniaxial alignment so as to be orthogonal to the substrates 21 and 22. In other words, as shown in FIG. 11(*b*), the liquid crystal molecule looks like a perfect circle as indicated by a liquid crystal molecule 40*a*, when viewed in front direction. When viewed in directions other than the front direction, the longitudinal axis direction of the liquid crystal molecule is in parallel to the x direction as indicated by liquid crystal molecules 40*b* and 40*c*. Therefore, the longitudinal axis direction is in parallel to the polarizing direction of the incident light, in whichever direction (including the direction orthogonal to the substrates) the liquid crystal molecule is projected. In case where the longitudinal axis direction of the liquid crystal molecule projection forms an angle of 0° with (i.e. is in parallel to) the polarizing direction of the incident light, the incident light passes through without being influenced by birefringence. On this account, an image on the main LCD 14 is viewable in whichever directions. This state, i.e. a state of no voltage application, is set as the wide viewing angle mode.

On the other hand, in the narrow viewing angle mode, an alternating voltage is applied by a first circuit (not illustrated) to the first transparent electrode film 26 and the second transparent electrode film 27, in such a manner as to cause the liquid crystal molecules in the wide viewing angle mode to rotate around the axis along the x direction, for 45° with respect to the substrates 21 and 22. The state of the liquid crystal molecules in this case is identical with that in the example 1 of the liquid crystal molecule alignment of the SW-LCD shown in FIG. 10.

Therefore, on account of a similar arrangement, when a voltage is applied to the first transparent electrode film 26 and the second transparent electrode film 27, as shown in FIG. 4, an image on the main LCD 14 is viewable without the influence of birefringence if the display section 4 is viewed in front direction (i.e. viewed by the viewer 31), but a logo image is viewed in directions other than the front direction (i.e. for the viewers 32 and 33), on account of the influence of birefringence.

Transmittance Measurement Experimentation

Using the SW-LCDs of the examples 1 and 3 of liquid crystal molecule alignment, the variation in the transmittance in the sight line direction in the plural image display mode was measured. The results thereof are shown in FIGS. 12 and 13.

Figure 12:
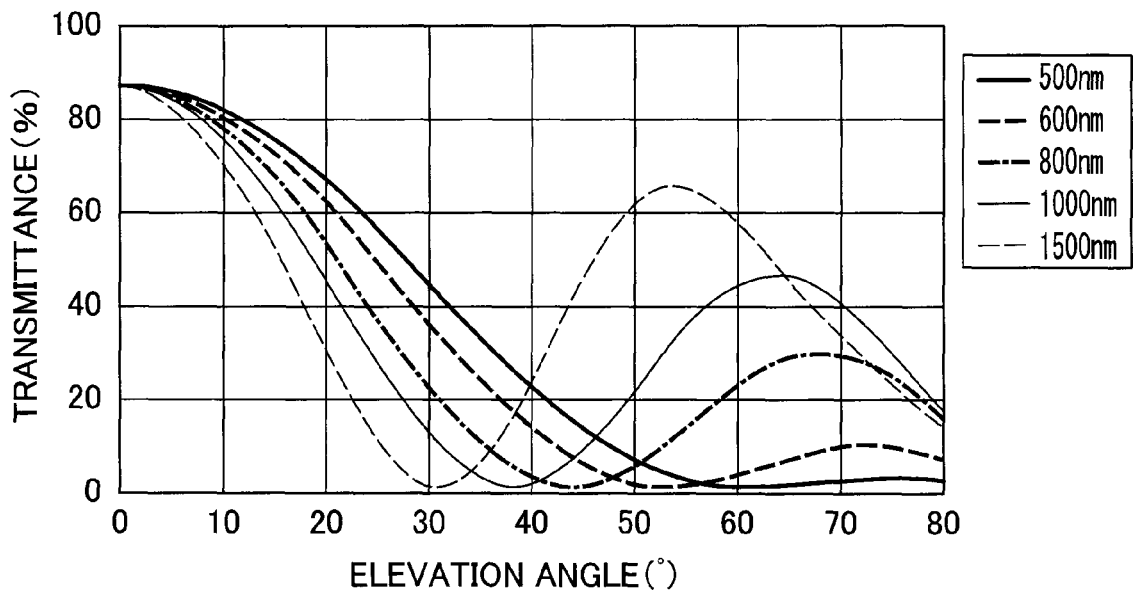
FIG. 12 is a graph showing the relationship between the elevation angle of the sight line and the transmittance in an SW-LCD of the embodiment of the present invention.
Figure 13:
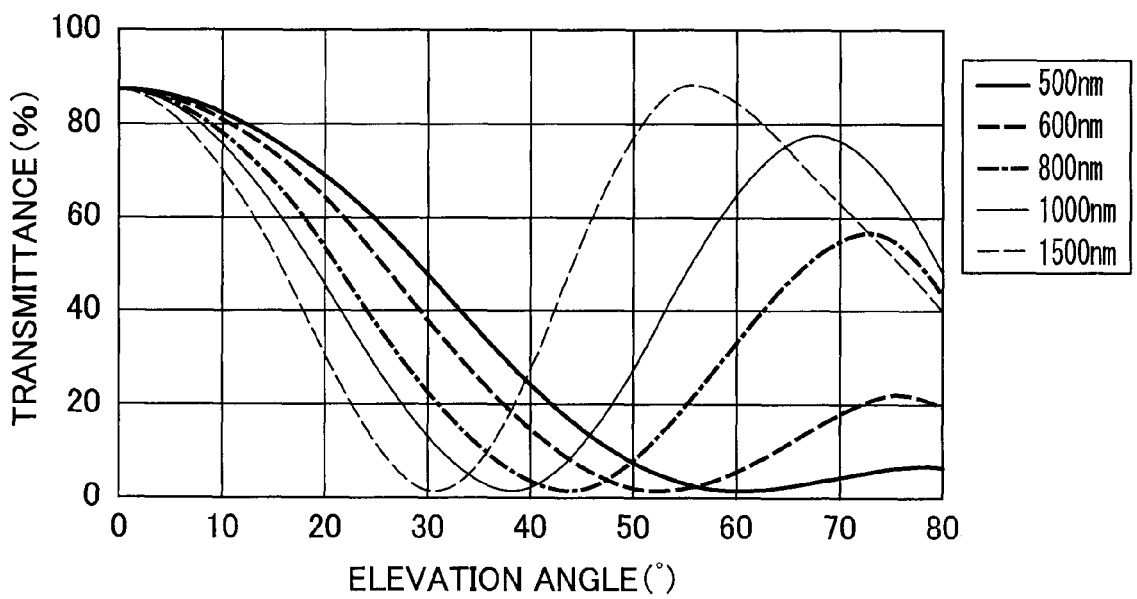
FIG. 13 is a graph showing the relationship between the elevation angle of the sight line and the transmittance in an SW-LCD of said another embodiment of the present invention.

FIG. 12 is a graph showing the measurement results in case where the SW-LCD of the example 1 of liquid crystal molecule alignment is set in the plural image display mode. The measurements were carried out in such conditions that the polarization transmission axis of the first polarizing plate was provided in the vertical direction, and the viewpoint was moved in the horizontal direction without changing the objective point from the sight line (with an elevation angle of 0°) orthogonal to the display section 4 (i.e. in parallel to the normal line). The viewpoint was moved from the elevation angle of 0° to a point where the direction orthogonal to the display section 4 forms an angle of 80° with the sight line (i.e. an elevation angle of 80°), and the elevation angle of the sight line and the transmittance of the SW-LCD viewed in the sight line were measured. The horizontal axis of the graph indicates the elevation angles, whereas the vertical axis indicates the transmittances. The measurements were carried out using SW-LCDs whose retardation in front direction were 500 nm, 600 nm, 800 nm, 1000 nm, and 1500 nm, respectively.

According to the results, in all SW-LCDs the highest transmittance of about 85% was observed at the elevation angle of 0°, and the transmittance was decreased as the elevation angle was increased. In the case of the SW-LCD with the retardation of 1500 nm, the transmittance was about 0% at the elevation angle of about 30°, and the transmittance was increased again as the elevation angle was further increased. In the case of the SW-LCD with the retardation of 1000 nm, the transmittance was about 0% at the elevation angle of about 38°. In the case of the SW-LCD with the retardation of 800 nm, the transmittance was about 0% at the elevation angle of about 44°. In the cases of the SW-LCDs with the retardations of 600 nm and 500 nm, the transmittances were minimized at the elevation angles of about 50° and 60°, respectively, and the transmittances were not higher than 10% even if the elevation angles were further increased.

The retardation of the SW-LCD 12 is determined in consideration of directions at which an image on the main LCD is caused not to be viewable, or in consideration of the decrease in the required transmittance in accordance with the use environment, the brightness of the main LCD, or the like. For example, to hide an image on the main LCD 14 from the sight line at about an elevation angle of 45°, an SW-LCD 12 with the retardation of 500 nm to 1000 nm, whose transmittance at the elevation angle of about 45° is low, is adopted. To hide an image on the main LCD 14 from the sight line at about elevation angles of 30°-50°, an SW-LCD 12 with the retardation of 800 nm to 1000 nm, whose transmittance at that range of angles is low, is adopted. To hide an image on the main LCD 14 from the sight line at elevation angles of 40° or higher, an SW-LCD 12 with the retardation of 500 nm to 600 nm, whose transmittance is low at that range of angles, is adopted.

FIG. 13 is a graph showing measurement results in case where the SW-LCD 12 of the example 3 of the liquid crystal molecule alignment is set in the plural image display mode in a similar manner as above. As compared to FIG. 12, the transmittance at a high elevation angle is high. On this account, the longitudinal axis direction of the liquid crystal molecules is preferably substantially in parallel to the polarization transmission axis, as in the case of the example 1 of liquid crystal molecule alignment. Since the characteristics of the curves are similar to those of FIG. 12, an optimum retardation is selected in a similar manner.

Now, the following will describe the touch sensor of the mobile phone 1 of the present embodiment.

As discussed above, the setting of, for example, the aforesaid narrow viewing angle mode and the wide viewing angle mode or the like of the mobile phone 1 may be carried out by using the touch sensor 28, instead of the operation of the main operation buttons 6 shown in FIG. 2.

As in the conventional art, the display quality is deteriorated if a conductive film for position detection is added to a target electronic device. In the present embodiment, this problem of the deterioration in display quality is resolved because the first transparent electrode film 26 is used not only for an electrodes for display switching but also for an electrode for position detection.

In the present embodiment, a mode (viewing angle control mode) in which the first transparent electrode film 26 is used as an electrode for display switching is temporally separated from a mode (position detection mode) in which the first transparent electrode film 26 is used as an electrode for position detection, and switching is alternately made between these modes.

More specifically, (i) a viewing angle control mode in which an image viewed on the SW-LCD 12 is switched between the single image display mode and the plural image display mode and (ii) a position detection mode in which the contacting position of a contacting object is detected by position detection means (not illustrated) are time-shared by a switching circuit which will be discussed later, and either the viewing angle control mode or the position detection mode is carried out.

Figure 14:
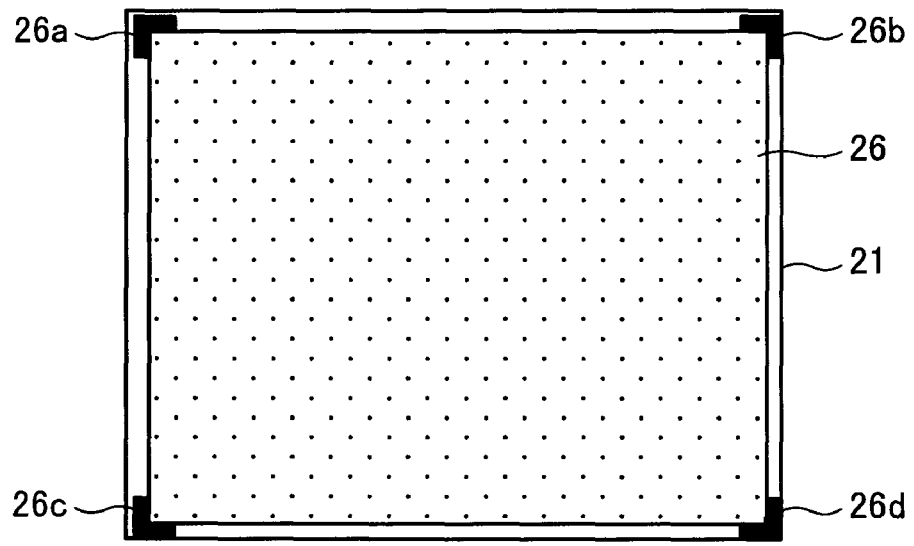
FIG. 14 is a plan view showing a first transparent electrode film of the SW-LCD of the embodiment of the present invention.

Details of the first transparent electrode film 26 in the display section 4 shown in FIG. 1 will be given. FIG. 14 is a plan view showing the first transparent electrode film 26.

As shown in FIG. 14, at the four corners of the first transparent electrode film 26, electrodes 26a-26d are formed, respectively. An alternating voltage is applied to these electrodes so that an electric field with a small gradient is substantially evenly formed in the first transparent electrode film 26.

When the second polarizing plate 11 of the display section 4 shown in FIG. 1 or the surface of an insulating member formed on the second polarizing plate 11 is touched by a pen or a finger, the first transparent is capacitively coupled with the ground. The capacity in this case is a total sum of the capacity between the second polarizing plate 11 and the first transparent electrode film 26 and the capacity between the human and the ground.

The electric resistance between the capacity-coupled contacting part and the electrodes 26a-26d of the first transparent electrode film 26 is in proportion to the distances between the contacting part and the electrodes 26a-26d. On this account, through the electrodes 26a-26d at the four corners of the first transparent electrode film 26, currents in proportion to the distances between the contacting part and the electrodes 26a-26d flow. The position coordinate of the contacting part is worked out by detecting the intensities of the aforesaid currents.

Figure 15:
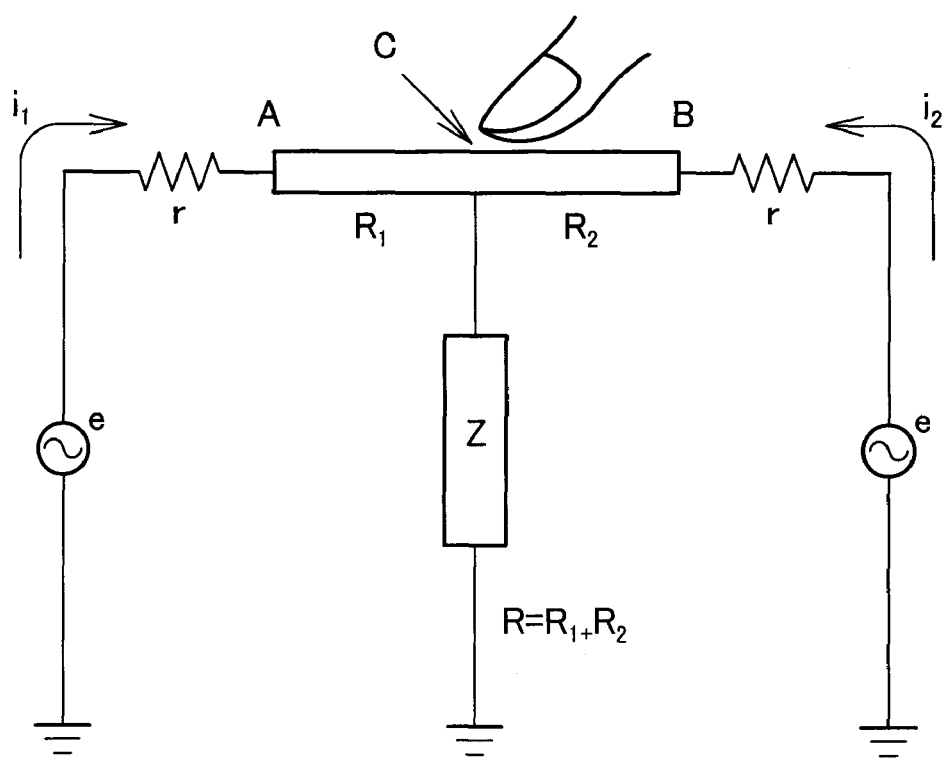
FIG. 15 is a circuit diagram for illustrating the principle of operation (in a single dimension) of an electrostatic capacitive coupling touch sensor.

With reference to FIG. 15, the following will describe the principle of operation of a position detection method of the present invention, which method adopts electrostatic capacitive coupling.

To simplify the description, FIG. 15 shows a one-dimensional resistive element which is sandwiched between an electrode A and an electrode B. In an actual display device, an opposing conductive layer which two-dimensionally spreads functions in a similar manner as the one-dimensional resistive element.

To each of the electrodes A and B, a resistor r for current-voltage conversion is connected. The electrodes A and B are connected to the position detection means via a below-described switching circuit. In the present embodiment, the positions of the switching circuit and the position detection means can be optionally determined. For example, the switching circuit and the position detection means may be formed on the substrate 22, or may be provided outside of the display section 4.

Between the electrode A and the ground and between the electrode B and the ground, voltages (alternating voltages e)

having the same phase and potential are applied, when the position detection mode is set. Since the electrodes A and B are always at the same electric potential, no current flows between the electrode A and the electrode B.

Assume that a position C is touched by a finger or the like. Also assume that the resistance between the contacting position C at which the finger contacts and the electrode A is $R_1$, the resistance between the contacting position C and the electrode B is $R_2$, and $R=R_1+R_2$. In this case, provided that the impedance of the human is Z, the current flowing in the electrode A is $i_1$, and the current flowing in the electrode B is $i_2$, the following equations (1) and (2) are given.

$$e=ri_1+R_1i_1+(i_1+i_2)Z \quad (1)$$

$$e=ri_2+R_2i_2+(i_1+i_2)Z \quad (2)$$

From these equations (1) and (2), the following equations (3) and (4) are obtained.

$$i_1(r+R_1)=i_2(r+R_2) \quad (3)$$

$$i_2=i_1(r+R_1)/(r+R_2) \quad (4)$$

The following equation (5) is given when the equation (4) is substituted into the equation (1).

$$e=ri_1+R_1i_1+(i_1+i_1(r+R_1)/(r+R_2))Z=i_1(R(Z+r)+R_1R_2+2Zr+r^2)/(r+R_2) \quad (5)$$

From the equation (5), the following equation (6) is obtained.

$$i_1=e(r+R_2)/(R(Z+r)+R_1R_2+2Zr+r^2) \quad (6)$$

In a similar manner, the following equation (7) is obtained.

$$i_2=e(r+R_1)/(R(Z+r)+R_1R_2+2Zr+r^2) \quad (7)$$

The following equation (8) is obtained by representing the ratio between R1 and R2 as the entire resistance R.

$$R_1/R=(2r/R+1)i_2/(i_1+i_2)-r/R \quad (8)$$

Since r and R are known, $R_1/R$ can be worked out from the equation (8), by measuring the current $i_1$ flowing in the electrode A and the current $i_2$ flowing in the electrode B. It is noted that $R_1/R$ does not depend on the impedance Z which includes that of the human whose finger touches the electrode. On this account, the equation (8) holds true on condition that the impedance Z is neither 0 nor infinite, and hence the changes and states on account of human and materials can be ignored.

Figure 16:
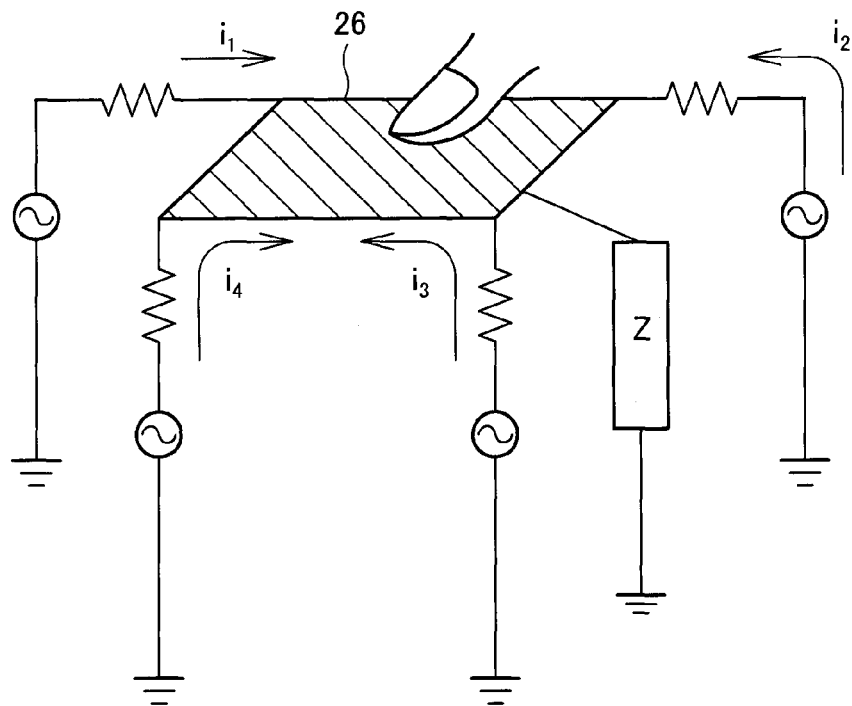
FIG. 16 is a circuit diagram for illustrating the principle of operation (in two dimensions) of the electrostatic capacitive coupling touch sensor.

Now, with reference to FIGS. 14 and 16, the following will explain a case where the above-described relational equations for one dimension are expanded to two dimensions. In this case, as shown in FIG. 14, four electrodes 26a-26d are formed on the respective four corners of the first transparent electrode film 26. These electrodes 26a-26d are connected to the position detection means via a switching circuit.

Referring to FIG. 16, the electrodes 26a-26d on the four corners of the first transparent electrode film 26 receive alternating voltages with the same phase and potential, and the currents flowing around the four corners of the first transparent electrode film on account of finger touch are assumed as $i_1, i_2, i_3$, and $i_4$, respectively. In the present case, the following equations are obtained by calculations similar to the above.

$$X=k_1+k_2\cdot(i_2+i_3)/(i_1+i_2+i_3+i_4) \quad (9)$$

$$Y=k_1+k_2\cdot(i_1+i_2)/(i_1+i_2+i_3+i_4) \quad (10)$$

In these equations, X indicates an X coordinate of the contacting position on the transparent electrode film, whereas Y indicates a Y coordinate of the contacting position on the transparent electrode film. Indicated by $k_1$ is an offset and indicated by $k_2$ is a magnification, and $k_1$ and $k_2$ are constants which are independent of the impedance of a human.

By the equations (9) and (10), it is possible to determine the contacting position with reference to the measured values of the currents $i_1$-$i_4$ flowing in the four electrodes 26a-26d.

In the example above, the contacting position on a two-dimensional plane is detected by measuring currents flowing in the electrodes provided at the four corners of the first transparent electrode film 26. However, the number of the electrodes on the first electrode film 26 is not limited to four. The minimum required number of electrodes for two-dimensional position detection is 3. When the number of electrodes is 5 or more, it is possible to improve the precision of position detection.

To determine the coordinates of the contacting position by using the aforesaid principle, it is necessary to measure the currents flowing in plural electrodes of the first transparent electrode film 26. The first transparent electrode film 26 is required to apply, to the liquid crystal layer 23, a predetermined voltage necessary for switching, when the viewing angle control mode is set.

As described above, in the present embodiment, (i) the viewing angle control mode in which an image to be viewed is switched between the single image display mode and the plural image display mode by the SW-LCD 12 and (ii) the position detection mode in which a contacting position of a contacting object is detected by the position detection means are time-shared by a switching circuit, and one of the viewing angle control mode and the position detection mode is carried out.

Figure 17:
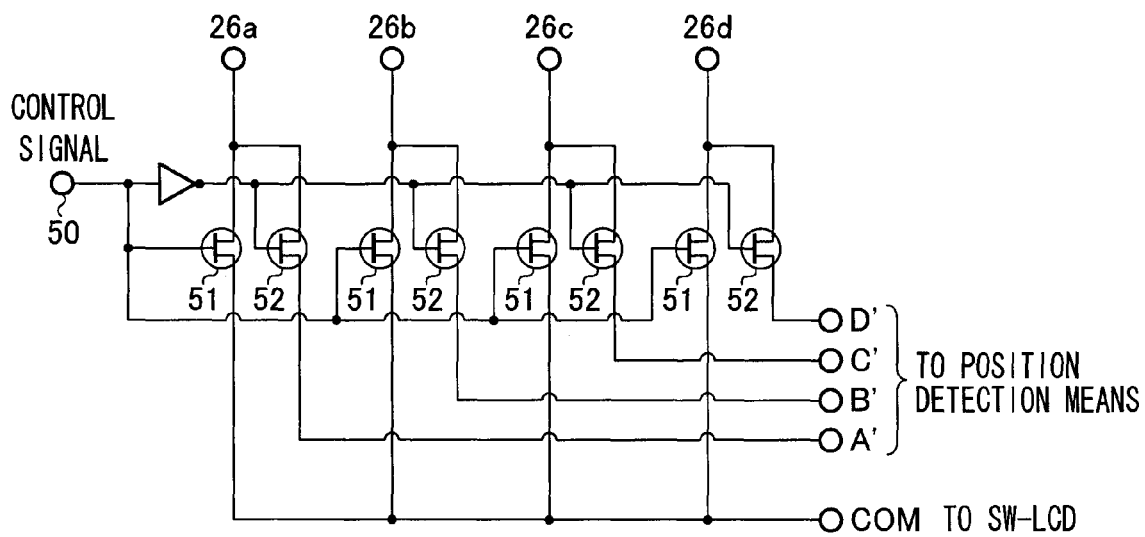
FIG. 17 is a circuit diagram for illustrating a switching circuit in the mobile phone of the embodiment of the present invention.

FIG. 17 is a circuit diagram showing an example of the switching circuit. To a terminal 50, a control signal for controlling the switching of the switching circuit is applied. This control signal is generated by a control circuit (not illustrated). When the control signal is at High level, a first transistor 51 in the switching circuit is turned on whereas a second transistor 52 is turned off. With this, the electrodes 26a-26d are electrically connected to a common electrode (COM) of the SW-LCD 12 and receives a voltage required for the switching.

In the meanwhile, when the control signal is switched from High level to Low level, the first transistor 51 in the switching circuit shown in FIG. 17 is turned off whereas the second transistor 52 is turned on. As a result, the electrodes 26a-26d are electrically connected to terminals A', B', C', and D' of the position detection means, respectively. Then the aforesaid measurement of the currents $i_1$-$i_4$ and the determination of the position coordinates are carried out.

The cycle of the alternating voltage which is applied to the first transparent electrode film 26 in the position detection mode falls, for example, within the range of 30-200 kHz, and the amplitude of the voltage falls, for example, within the range of 2-3V.

Figure 18:
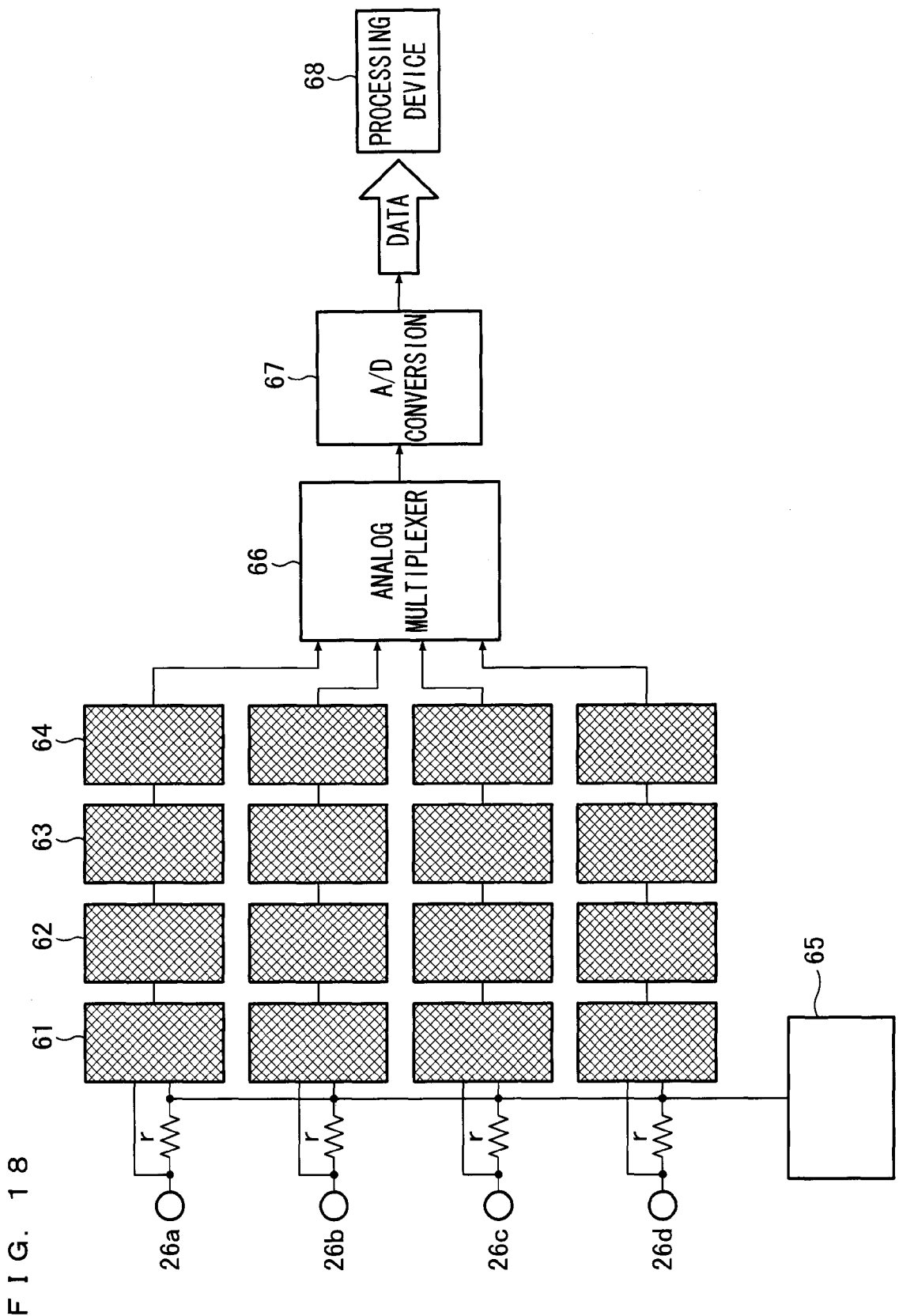
FIG. 18 is a block diagram of position detection means in the mobile phone of the embodiment of the present invention.

Now, the position detection means will be described with reference to FIG. 18. FIG. 18 illustrates in what manner the position detection means is arranged.

The position detection means illustrated in the figure is provided with four current variation detection circuits 61. The current variation detection circuits 61 measure currents flowing between the ground and the electrodes 26a-26d of the first transparent electrode film 26 when the position detection mode is set. Each of the electrodes 26a-26d receives an alternating voltage from a first circuit 65. For this reason, currents which flow in the electrodes A-D in response to finger touch or the like include alternating components. Outputs from the current variation detection circuits 61 are subjected to amplification and band-pass filtering by an analog signal processing circuit 62. An output from the analog signal processing circuit 62 is detected by an wave detector filtering circuit 63, and then supplied to a noise canceling DC conversion circuit 64. The noise canceling DC conversion circuit 64 coverts the output of the wave detector filtering circuit 63 to a direct current, so that a signal whose value is in proportion to the currents flowing in the electrodes 26a-26d is generated.

Receiving the aforesaid signal from the noise canceling DC conversion circuit 64, an analog multiplexer 66 switches the signal and sends outputs of the electrodes 26a-26d to an A/D converter 67, in the same order. The A/D converter 67 sends the digitized signal (data) to a processing device 68. The processing device 68 is mounted on the mobile phone 1 of the present embodiment and executes data processing.

As described above, the mobile phone 1 of the present embodiment is arranged such that a first transparent electrode film 26 which is a component of a SW-LCD 12 controlling viewing angles is used as a touch panel, and the mobile phone 1 is provided with position detection means which detects currents flowing from plural parts of the first transparent electrode film 26 when a contacting object contacts the surface of the first transparent electrode film 26, and which also detects the contacting position of the contacting object with reference to the detection results.

Thanks to this arrangement, it is possible to avoid the deterioration of display quality, which occurs when a transparent conductive film is added to the front surface of the SW-LCD 12.

Also, as described above, since the first transparent electrode film 26 is used as a touch panel, the reduction of the thickness and weight of the mobile phone 1 can be achieved even if the touch sensor is added as in the present invention.

Furthermore, since it is unnecessary to additionally provide a transparent conductive panel functioning as a touch panel, the number of components is reduced. On this account, the increase in costs can be restrained even if the touch sensor is added.

Furthermore, since the position detection is carried out using electrostatic capacitive coupling by which currents flowing from plural parts of the first transparent electrode film 26 are detected, air with a different refractive index does not exist between two resistant films, in contrast to the resistant film method. Therefore the transmittance of light is not decreased. On this account, a touch sensor is combined with a display device without reducing the brightness of an image displayed on the display device, and hence a high-performance display device which suitably switching displayed images and has a touch panel is provided.

In the mobile phone 1 of the present embodiment, a single image display mode is arranged such that no voltage is applied to the first transparent electrode film 26 and the second transparent electrode film 27, whereas a plural image display mode is arranged such that a predetermined voltage is applied to the transparent electrode films. Alternatively, a plural image display mode is arranged such that no voltage is applied whereas a single image display mode is arranged such that a predetermined voltage is applied to the transparent electrode films. This arrangement is realized in such a manner that, for example, liquid crystal molecules are tilted for 45° in advance with respect to substrates and voltage application causes the liquid crystal molecules to be substantially orthogonal to or substantially in parallel to the substrates. This arrangement makes it possible to reduce power consumption, in case where a narrow viewing angle is frequently preferred in the plural image display mode.

The SW-LCD 12 is provided with a pattern electrode which is cut out so as not to overlap logo parts, and the alignment of the liquid crystal molecules is changed at positions corresponding to the pattern electrode, when the plural image mode is set. Alternatively, the SW-LCD 12 may be driven in accordance with a matrix method. For example, the alignment of the liquid crystal molecules corresponding to pixels on the SW-LCD 12 may be controlled by the switching of a TFT (Thin Film Transistor) provided in each pixel. In this case, a video signal is supplied to the SW-LCD 12 and the alignment of the liquid crystal molecules is changed at regions indicated by the video signal. This makes it possible to overlap a still image or a moving image on an image displayed by the main LCD 14.

The display device of the present embodiment is arranged such that the viewing angle is controlled in such a manner as to prevent an image on the main LCD 14 from being viewed in oblique directions (i.e. on the left side or right side of the front direction). Alternatively, the viewing angle may be controlled in such a manner as to prevent the image from being viewed in oblique upward directions or oblique downward directions.

This arrangement is realized in such a manner that the main LCD 14 and the SW-LCD 12 are pasted together so that the horizontal direction of an image displayed on the main LCD 14 is substantially in parallel to a plane drawn by the rotation of a point on the liquid crystal molecule, which rotation is carried out to change the alignment.

Figure 19:
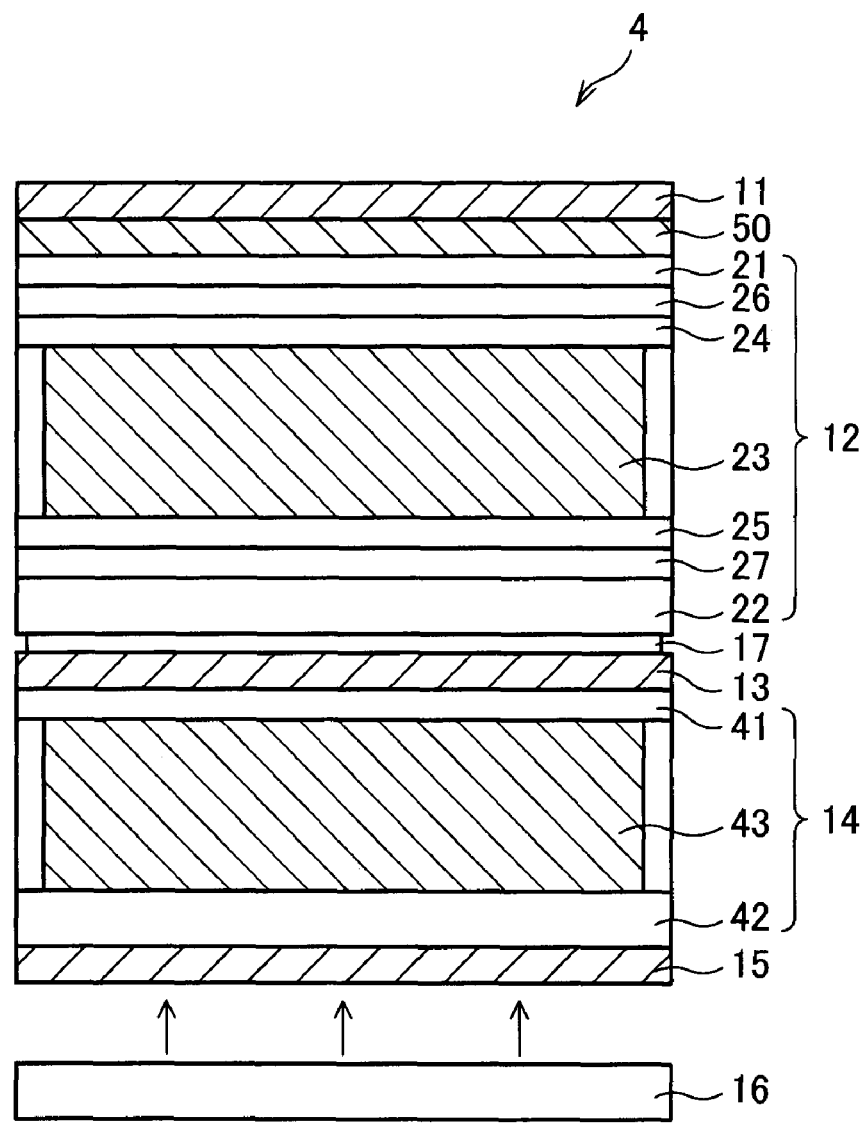
FIG. 19 is a cross sectional view of another example of the display section in the mobile phone of the embodiment of the present invention.

In the display device of the present embodiment, the polarization transmission axes of the first polarizing plate 13 and the second polarizing plate 11 are in parallel to one another. However, the same function can be achieved even if the polarization transmission axes forms an angle. This can be achieved in such a manner that, as shown in FIG. 19, a polarizing rotational member 55, which rotates the polarizing direction of incident light, is provided between the second polarizing plate 11 and the substrate 21. In other words, the polarizing rotational member 55 rotates the polarizing direction of linearly-polarized light emitted from the liquid crystal molecules so as to allow the second polarizing plate 11 to obtain the linear-polarized light, even if the polarization transmission axis of the first polarizing plate 13 is not in parallel to the polarization transmission axis of the second polarizing plate 11. The polarizing rotational member 55 is, for example, a ½λ plate (retardation plate).

The polarizing rotational plate 55 can be provided on the light incident side of the liquid crystal layer 23 or on the light output side of the liquid crystal layer 23, on condition that the plate 55 is provided between the first polarizing plate 13 and the second polarizing plate 11. The polarizing rotational member 55 may be provided on the light incident side of the first polarizing plate 13.

Although the present embodiment describes a case where the present invention is adopted to a liquid crystal display section of a mobile phone, the present invention is not limited to this arrangement. The present invention can be adopted to any mobile electronic devices having display devices, such as mobile PCs, audio-video equipments, and DVD players. Alternatively, the present invention is adopted to a non-mobile display device which can display different images depending on the directions of sight lines.

Embodiment 2

The following will describe another embodiment of the present invention. By the way, to clarify the differences from Embodiment 1, members having the same functions as those described in Embodiment 1 are given the same numbers, so that the descriptions are omitted for the sake of convenience.

FIG. 20 shows position detection means provided in a mobile phone 1 of the present embodiment. In the above-described mobile phone 1 of Embodiment 1, either the viewing angle control mode or the position detection mode is set by the switching circuit. On the contrary, the present embodiment adopts the following arrangement: the frequency of a voltage for position detection, which is supplied to the first transparent electrode film 26, is made to be different from the frequency of a voltage for display switching, which is also supplied to the first transparent electrode film, so that position detection is carried out by obtaining only the frequency for the position detection. This makes it unnecessary to carry out the switching of modes, and hence it is possible to simultaneously carry out the viewing angle control mode and the position detection mode. The present embodiment can be realized by using high-pass filters (HPF; frequency detection means) 29, as shown in FIG. 20.

More specifically, the electrodes 26a-26d provided on the first transparent electrode film 26 are connected to (i) a viewing angle control circuit 71 which supplies to the first transparent electrode film 276 an alternating voltage for viewing angle control and (ii) a position detection circuit 72 which supplies to the first transparent electrode film 26 an alternating voltage for position detection.

In other words, to the first transparent electrode film 26, (i) the viewing angle control circuit 71 applies a low-frequency (e.g. 100 Hz) alternating voltage for generating an electric field on the liquid crystal layer 23 of the SW-LCD 12 so as to change the alignment of the liquid crystal molecules and (ii) the position detection circuit 72 applies a high-frequency (e.g. 30-200 kHz) alternating current for position detection, which voltage is used for detecting a contacting position on the first transparent electrode film 26 which functions as a touch sensor.

In this way, in the present embodiment, both the alternating voltage for viewing angle control and the alternating voltage for position detection are applied to the first transparent electrode film 26. On this account, to carry out the detection, it is necessary to obtain, from the first transparent electrode film 26, a current derived from the high-frequency voltage for position detection, and supply the obtained current to the circuits of the position detection means shown in FIG. 20. On this account, the position detection means shown in FIG. 20 is provided with four high-pass filters 29 corresponding to the respective electrodes 26a-26d. With the high-pass filters 29, a high-frequency current for position detection can be obtained even if a low-frequency voltage is mixed with a high-frequency voltage, and the high-frequency current can be supplied to the current variation detection circuit 61. As a result, it is possible to generate a signal whose value is in proportion to currents which pass through the analog signal processing circuit 62, the wave detector filtering circuit 63, and the noise canceling DC conversion circuit 64, and flow in the respective electrodes 26a-26d.

With the arrangement above, the mobile phone 1 of the present embodiment is not required to perform switching in the circuit, between a case where a voltage or current for display switching is supplied and a case where a voltage or current for position detection is supplied.

That is to say, it is unnecessary to use the first transparent conductive film in a time-sharing manner and the display switching and the position detection can be simultaneously carried out. As a result, no delay in the application of a display voltage occurs, in contrast to the case where the first transparent conductive film is used in a time-sharing manner.

In addition to the prevention of the delay in the application of a display voltage, position detection is rapidly carried out. This makes it possible to provide a mobile phone 1 which can suitably perform the display switching and position detection.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

A display device of the present invention can be set in a mode in which different images are viewed depending on the direction of the sight line. The display device can therefore be adopted as a display of a mobile electronic device such as a mobile communication terminal, a mobile PC, an audio/visual equipment, and a DVD player, and also adopted as a display which can show different types of information depending on the direction of the sight line.

The invention claimed is:

1. A display device, comprising:
an image display device arranged to display an image; and
a display switching device arranged to electrically switch the image displayed on the image display device, between (i) a single image display mode in which the image is viewable in any of a front direction and a plurality of oblique directions with respect to the image display device, and (ii) a plural image display mode in which the image is viewable in the front direction but not in the plurality of oblique directions, the image display device being provided on a front side of the display device; wherein
the display switching device is arranged to keep a liquid crystal layer between a pair of substrates and includes a front-side first transparent conductive film arranged to apply a voltage to the liquid crystal layer and a back-side second transparent conductive film, and
the display device further includes a position detection device arranged to detect, when a contacting object contacts a front surface of the display switching device, a contacting position of the contacting object by detecting currents flowing from plural parts of the first transparent conductive film.

2. The display device as defined in claim 1, wherein,
in the single image display mode, an image displayed by the image display device is viewable in any directions, whereas, in the plural image display mode, when viewed in a certain direction, another image overlaps the image displayed by the image display device, on account of birefringence caused by the display switching device.

3. The display device as defined in claim 1, wherein,
the display switching device further includes a first polarizing device arranged to output unidirectional linearly polarized light and a second polarizing device arranged to allow the linearly polarized light, which has been output from the display switching device, to pass through,
when liquid crystal molecules in the liquid crystal layer are projected in a direction orthogonal to surfaces of said pair of substrates, a longitudinal axis direction of liquid crystal molecules is always in parallel to or orthogonal to a linear polarization direction of light incident to the liquid crystal molecules, in the single image display mode, a longitudinal axis direction of at least some of the liquid crystal molecules is aligned to be in parallel to or orthogonal to the surfaces of said pair of substrates, and in the plural image display mode, the longitudinal axis direction of said at least some of the liquid crystal molecules is aligned to be tilted with respect to the surfaces of said pair of substrates.

4. The display device as defined in claim 1, wherein, (i) display switching performed by the display switching device between the single image display mode and the plural image display mode and (ii) detection of the contacting position of the contacting object by the position detection device are alternately switchable.

5. The display device as defined in claim 1, further comprising:

a first circuit which is arranged to supply a voltage or current to the first transparent conductive film for display switching; and a second circuit which is arranged to supply a voltage or current to the first transparent conductive film for position detection, wherein a frequency of the voltage or current supplied from the first circuit to the first transparent conductive film is different from a frequency of the voltage or current supplied from the second circuit to the first transparent conductive film.

6. The display device as defined in claim 5, further comprising a frequency detection device arranged to obtain only a voltage or current which has a particular frequency.

7. The display device as defined in claim 1, wherein, the first transparent conductive film is divided so as to have plural regions, and a current flowing between at least two of the regions is detected by the position detection device.

8. The display device as defined in claim 3, wherein, a polarization transmission axis of the first polarizing device is in parallel to a polarization transmission axis of the second polarizing device, and the polarization transmission axes are in parallel to or orthogonal to the longitudinal axis direction of the liquid crystal molecules, when the liquid crystal molecules are projected in the direction orthogonal to the surfaces of said pair of substrates.

9. The display device as defined in claim 1, wherein, the second transparent conductive film is a pattern electrode with a particular shape, and alignment of the liquid crystal molecules in the liquid crystal layer changes at a region where a voltage or current is applied to the pattern electrode.

10. The display device as defined in claim 3, further comprising a third polarizing device arranged to cause unidirectional linearly polarized light to enter the image display device, the third polarizing device being provided on one surface of the image display device, whereas the first polarizing device is provided on the other surface of the image display device, the second polarizing device being provided on one surface of the display switching device, and the other surface of the display switching device, on which the second polarizing device is not provided, being pasted onto the image display device.

11. The display device as defined in claim 1, wherein, in the plural image display mode, a longitudinal axis direction of liquid crystal molecules forms an angle of not less than 40° and not more than 50° with surfaces of said pair of substrates.

12. A viewing angle control device which controls a viewing angle of incident light and outputs the incident light, and which also detects a contacting position of a contacting object on a surface of a device, the viewing angle control device comprising:

a liquid crystal element;

a linear polarization plate provided on the liquid crystal element; and a position detection element, wherein the liquid crystal element includes an opposing transparent electrode, when the contacting object contacts, the position detection element detecting the contacting position of the contacting object by detecting currents flowing from plural portions of the opposing transparent electrode, a longitudinal axis direction of liquid crystal molecules in the liquid crystal element being in parallel to a plane formed by (i) a direction of either a transmission axis or an absorption axis of the linear polarization plate and (ii) a traveling direction of light, the liquid crystal molecules being either: in parallel to or orthogonal to the traveling direction of the light; or tilted with respect to the traveling direction of the light, and the viewing angle control device is arranged to switch the viewing angle of the incident light between (i) a wide angle viewing mode in which the incident light is viewable in any direction, and (ii) a narrow angle viewing mode in which the incident light is viewable only in a specific direction such that at least a portion of the incident light is not viewable in a direction different from the specific direction.

13. An electronic device comprising the display device defined in claim 1.

14. An electronic device comprising the viewing angle control device defined in claim 12.

* * * * *